(12) United States Patent
Narayanan

(10) Patent No.: US 8,221,721 B2
(45) Date of Patent: Jul. 17, 2012

(54) POLYCYCLO DYES AND USE THEREOF

(75) Inventor: Narasimhachari Narayanan, Westford, MA (US)

(73) Assignee: VisEn Medical, Inc., Waltham, MA (US)

(*) Notice: Subject to any disclaimer, the term of this patent is extended or adjusted under 35 U.S.C. 154(b) by 1068 days.

(21) Appl. No.: 12/028,209

(22) Filed: Feb. 8, 2008

(65) Prior Publication Data

US 2008/0286207 A1 Nov. 20, 2008

Related U.S. Application Data

(60) Provisional application No. 60/889,066, filed on Feb. 9, 2007.

(51) Int. Cl.
*A61B 5/00* (2006.01)
*C07D 263/62* (2006.01)
*C07D 495/02* (2006.01)

(52) U.S. Cl. .......... 424/9.6; 548/219; 548/453

(58) Field of Classification Search .......... None
See application file for complete search history.

(56) References Cited

U.S. PATENT DOCUMENTS

| | | | |
|---|---|---|---|
| 4,219,335 A | 8/1980 | Ebersole | |
| 5,164,297 A | 11/1992 | Josephson et al. | |
| 5,445,970 A | 8/1995 | Rohr | |
| 5,561,039 A | 10/1996 | Ochiai | |
| 5,593,658 A | 1/1997 | Bogdanov et al. | |
| 5,604,088 A | 2/1997 | Asami et al. | |
| 5,876,915 A | 3/1999 | Deroover et al. | |
| 6,046,585 A | 4/2000 | Simmonds | |
| 6,048,982 A | 4/2000 | Waggoner | |
| 6,083,485 A | 7/2000 | Licha et al. | |
| 6,083,486 A | 7/2000 | Weissleder et al. | |
| 6,086,737 A | 7/2000 | Patonay et al. | |
| 6,136,612 A | 10/2000 | Della Ciana et al. | |
| 6,180,086 B1 | 1/2001 | Achilefu et al. | |
| 6,183,726 B1 | 2/2001 | Achilefu et al. | |
| 6,258,340 B1 | 7/2001 | Licha et al. | |
| 6,275,031 B1 | 8/2001 | Simmonds | |
| 6,395,257 B1 | 5/2002 | Achilefu et al. | |
| 6,448,008 B1 | 9/2002 | Caputo et al. | |
| 6,534,041 B1 | 3/2003 | Licha et al. | |
| 6,592,847 B1 | 7/2003 | Weissleder et al. | |
| 6,615,063 B1 | 9/2003 | Ntziachristos et al. | |
| 6,720,351 B2 | 4/2004 | Bertinato et al. | |
| 6,740,755 B2 | 5/2004 | Caputo et al. | |
| 6,747,159 B2 | 6/2004 | Caputo et al. | |
| 6,869,593 B2 | 3/2005 | Frangioni | |
| 6,913,743 B2 | 7/2005 | Licha et al. | |
| 6,926,885 B2 | 8/2005 | Licha et al. | |
| 6,949,572 B2 | 9/2005 | Bertinato et al. | |
| 7,025,949 B2 | 4/2006 | Licha et al. | |
| 7,374,746 B2 | 5/2008 | Frangioni | |
| 7,445,767 B2 | 11/2008 | Licha et al. | |
| 7,655,217 B2 | 2/2010 | Licha et al. | |
| 7,947,256 B2 | 5/2011 | Rajopadhye et al. | |

| | | |
|---|---|---|
| 2002/0064794 A1 | 5/2002 | Leung et al. |
| 2003/0124194 A1 | 7/2003 | Gaw et al. |
| 2003/0143499 A1 | 7/2003 | Kagawa et al. |
| 2004/0260072 A1 | 12/2004 | Licha et al. |
| 2005/0169843 A1 | 8/2005 | Weissleder et al. |
| 2005/0171434 A1 | 8/2005 | Madden et al. |
| 2005/0214221 A1 | 9/2005 | Poss et al. |
| 2006/0275775 A1 | 12/2006 | Weissleder et al. |
| 2006/0280688 A1 | 12/2006 | Kovar et al. |
| 2008/0226562 A1 | 9/2008 | Groves et al. |
| 2008/0267883 A1 | 10/2008 | Rajopadhye et al. |
| 2009/0037114 A1 | 2/2009 | Peng et al. |
| 2009/0068115 A1 | 3/2009 | Gaw et al. |
| 2009/0130024 A1 | 5/2009 | Narayanan et al. |
| 2009/0220430 A1 | 9/2009 | Rajopadhye et al. |
| 2010/0074847 A1 | 3/2010 | Madden et al. |

(Continued)

FOREIGN PATENT DOCUMENTS

EP 0949537 7/2002

(Continued)

OTHER PUBLICATIONS

Josephson et al. "Near-Infrared Fluorescent Nanoparticles as Combined MR/Optical Imaging Probes" Bioconjugate Chem. 2002, 13, 554-560.
Kircher et al. "A Dual Fluorochrome Probe for Imaging Proteases" Bioconjugate Chem. 2004, 15, 242-248.
Reynolds et al. "Stable Heptamethine Pyrylium Dyes that Absorb in the Infrared" J. Org. Chem., vol. 42, No. 5, 1977.
Alfano et al. (1997) "Advances in Optical Imaging of Biomedical Media" *Ann. NY Acad. Sci.* 820:248-271.
Citrin et al. (2004) "Optical imaging of mice in oncologic research" *Expert Rev. Anticancer Ther.* 4:857-864.
Graves et al. (2004) "Fluorescence Molecular Imaging of Small Animal Tumor Models" *Curr. Mol. Med.* 4:419-430.

(Continued)

*Primary Examiner* — Janet Andres
*Assistant Examiner* — Heidi Reese
(74) *Attorney, Agent, or Firm* — Goodwin Procter LLP

(57) ABSTRACT

The invention relates to a family of fluorescent compounds of Formula (I). The compounds can be chemically linked to biomolecules, such as proteins, nucleic acids, and therapeutic small molecules. The compounds can be used for imaging in a variety of medical, biological and diagnostic applications, and are particularly useful for the in vivo imaging of regions of interest within a mammal.

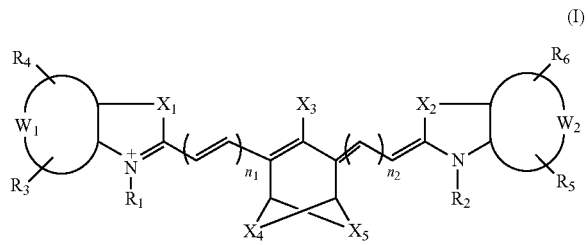

48 Claims, No Drawings

U.S. PATENT DOCUMENTS

| | | |
|---|---|---|
| 2010/0129293 A1 | 5/2010 | Licha et al. |
| 2010/0166659 A1 | 7/2010 | Licha et al. |
| 2010/0172841 A1 | 7/2010 | Peterson et al. |
| 2010/0189657 A1 | 7/2010 | Weissleder et al. |
| 2010/0268070 A1 | 10/2010 | Jaffer et al. |
| 2011/0152501 A1 | 6/2011 | Weissleder et al. |
| 2011/0165075 A1 | 7/2011 | Rajopadhye et al. |
| 2011/0171136 A1 | 7/2011 | Poss et al. |

FOREIGN PATENT DOCUMENTS

| | | |
|---|---|---|
| EP | 1462854 | 9/2004 |
| EP | 1496375 | 1/2005 |
| IT | 1337683 | 2/2007 |
| WO | WO-03/079015 | 9/2003 |
| WO | WO-03/102558 | 12/2003 |
| WO | WO-2004/083902 | 9/2004 |
| WO | WO-2004/108902 | 12/2004 |
| WO | WO-2005/017539 | 2/2005 |
| WO | WO-2007/028037 | 3/2007 |
| WO | WO-2007/028118 | 3/2007 |
| WO | WO-2007/028163 | 3/2007 |
| WO | WO-2007/136413 | 11/2007 |
| WO | WO-2008/100817 | 8/2008 |

OTHER PUBLICATIONS

Hamer (1949) "Some Unsymmetrical Pentamethincyanine Dyes and their Tetramethin Intermediates" *J. Chem. Soc.* 32-37.

International Search Report for PCT/US2008/053399, mailed on Feb. 13, 2009 (4 pages).

Koo et al. (2006) "Non-invasive in vivo imaging in small animal research" *Cell Oncol.* 28:127-139.

Mujumdar et al. (1993) "Cyanine Dye Labeling Reagents: Sulfoindocyanine Succinimidyl Esters" *Bioconjugate Chem.* 4:105-111.

Ntziachristos (2006) "Fluorescence Molecular Imaging" *Ann. Rev. Biomed. Eng.* 8:1-33, v-vi.

Ntziachristos et al. (2003) "Fluorescence imaging with near-infrared light: new technological advantages that enable in vivo molecular imaging" *Eur. Radiol.* 13:195-208.

Rao et al. (2007) "Fluorescence imaging in vivo: recent advantages" *Curr. Opin. Biotechnol.* 18:17-25.

Sun et al. (2006) ""Clickable" Nanoparticles for Targeted Imaging" Mol Imaging 5(2):122-128.

Weissleder (2001) "A clearer vision for in vivo imaging" *Nature Biotechnology* 19:316-317.

Written Opinion of the International Searching Authority for International Patent Application No. PCT/US2008/053399, mailed on Feb. 13, 2009 (8 pages).

POLYCYCLO DYES AND USE THEREOF

RELATED APPLICATIONS

This application claims priority to U.S. Ser. No. 60/889,066 filed Feb. 9, 2007, which is hereby incorporated by reference in its entirety.

BACKGROUND

Optical imaging methods offer a number of advantages over other imaging methods. Such imaging typically uses light in the red and near-infrared (NIR) range (600-1200 nm) to maximize tissue penetration and minimize absorption from natural biological absorbers such as hemoglobin and water. Optical imaging may provide high sensitivity, does not require exposure of test subjects or laboratory personnel to ionizing radiation, can allow for simultaneous use of multiple, distinguishable probes (which may be important in molecular imaging), and offers high temporal and spatial resolution, which is important in functional imaging and in vivo microscopy, respectively.

In fluorescence imaging, filtered light or a laser with a defined bandwidth is used as a source of excitation light. The excitation light travels through body tissue, and when the excitation light encounters a reporter molecule (for example, a contrast agent or imaging probe), the light is absorbed. The reporter molecule then emits light that has detectably different properties from the excitation light. The resulting emitted light then can be used to construct an image. Most optical imaging techniques have relied on the use of organic and inorganic fluorescent dyes as the reporter molecule.

Fluorescent dyes are generally known and used for fluorescence labeling and detection of various biological and non-biological materials by procedures such as fluorescence microscopy, fluorescence immunoassay, and flow cytometry. A typical method for labeling such materials with fluorescent dyes is to create a fluorescent complex by means of bonding between suitable groups on the dye molecule and compatible groups on the material to be labeled. In this way, materials such as cells, tissues, amino acids, proteins, antibodies, drugs, hormones, nucleotides, nucleic acids, lipids and polysaccharides and the like may be chemically labeled and detected or quantified, or may be used as fluorescent probes which can bind specifically to target materials and detected by fluorescence detection methods. Brightly fluorescent dyes permit detection or localization of the attached materials with great sensitivity.

For many years, polymethine dyes have been useful as sensitizers in photography, especially in the red and near infrared regions of the spectrum. However, in more recent years, these dyes have been used in a variety of different innovative technological areas, such as laser and electro-optic applications, optical recording media, and medical diagnostic applications. Such applications place high demands on dyes, for example, on the degree of purity required and the reproducibility of synthetic methods. Polymethine dyes are useful as labeling agents in biological applications, especially when such dyes include functional groups that are capable of forming a stable covalent bond with a biological molecule of interest so that the resulting conjugate will function as an efficient fluorescent biological analyte or probe.

Notwithstanding, there is an ongoing need for new dyes that can be used in various medical, diagnostic and biological applications.

SUMMARY OF THE INVENTION

The invention is based, in part, upon the discovery that it is possible to produce fluorochrome compounds containing a polymethine bridge, which can be used in a variety of in vitro and in vivo imaging applications.

In one aspect, the invention provides a family of fluorochrome compounds that can be generally represented by Formula 1:

$$Z^1\text{-PMB-}Z^2 \qquad (1), \text{ and salts thereof,}$$

wherein $Z^1$ and $Z^2$ each independently represent a polycyclic group comprising a heterocyclic moiety, and PMB represents a polymethine bridge comprising a bridged polycyclo moiety. In certain embodiments, the polymethine bridge comprises a bridged bicyclo moiety.

In a preferred embodiment, the fluorochrome compounds of the invention have the formula

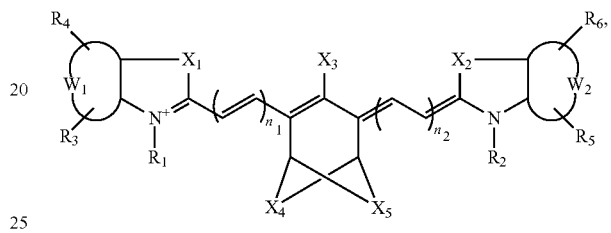

and salts thereof, wherein $R_1$, $R_2$, $R_3$, $R_4$, $R_5$, $R_6$, $X_1$, $X_2$, $X_3$, $X_4$, $X_5$, $W_1$, $W_2$, $n_1$ and $n_2$ are described in more detail below.

In another aspect, the invention provides an in vivo optical imaging method. The method comprises the steps of (a) administering to a subject, such as an animal or human, a fluorochrome compound of the invention, (b) allowing the fluorochrome compound to distribute within the subject or to contact or interact with a biological target, (c) exposing the subject to electromagnetic radiation, for example, light, of a wavelength absorbable by the fluorochrome compound, and (d) detecting an optical signal emitted by the fluorochrome compound, for example, with an endoscope, catheter, tomographic system, a planar or reflectance system, hand-held optical imaging system, or intraoperative systems and microscope. The signal emitted by the compound can be used to construct an image, for example, a tomographic image, of a region or structure to be imaged. It is understood that the fluorochrome compound can comprise a fluorochrome dye chemically linked to a biomolecule.

The foregoing steps may be repeated at predetermined intervals thereby permitting the evaluation of the emitted signals of the fluorescent compound in the subject over time. In certain embodiments two or more compounds whose signal properties are distinguishable can be administered to the subject and their emission properties can be used to image two or more features in the subject.

The disclosed methods can be used to detect and/or monitor a disease, for example, bone disease, cancer, cardiovascular disease, dermatological disease, environmental disease, immunologic disease, infectious disease, inflammation, inherited disease, metabolic disease, neurodegenerative disease, ophthalmic disease, and respiratory disease.

In certain embodiments, cells are labeled with a fluorochrome compound described herein and the resulting labeled cells administered to the subject. The signal emitted by the fluorochrome compound can be used to monitor transport and localization of the cells or to evaluate the efficacy of a cell therapy.

In another aspect, the invention provides an in vitro optical imaging method. The method comprises the steps of (a) contacting a sample, for example, a biological sample, with the fluorochrome compound of the invention, (b) allowing the fluorochrome compound to become activated by or to bind to a biological target; (c) optionally, removing unbound fluorochrome compound; (d) exposing the sample to electromagnetic radiation, for example, light, of a wavelength absorbable by the fluorochrome compound; and (e) detecting signal emitted from the fluorochrome compound thereby to determine whether the fluorochrome compound has been activated by or bound to the biological target.

DETAILED DESCRIPTION OF THE INVENTION

The present invention provides a family of fluorochrome compounds (dyes) that absorb and/or emit light having a wavelength in the range from about 500 nm to about 1100 nm, more preferably in the range from about 600 nm to about 900 nm. In certain embodiments, the dyes absorb and/or emit light having a wavelength in the range from about 600 nm to about 850 nm, from about 650 nm to about 900 nm, or from about 650 nm to about 850 nm. The fluorochrome compounds are particularly useful in a variety of in vitro and in vivo imaging applications.

The fluorochrome compounds of the invention can be represented by the formula $Z^1$-PMB-$Z^2$, and salts thereof, wherein $Z^1$ and $Z^2$ each independently represent the same or different polycyclic groups containing a heterocyclic moiety, and PMB represents a polymethine bridge comprising a bridged polycyclo moiety. The fluorochrome compounds will be discussed in more detail hereinbelow. However, before further description of the present invention, certain terms employed in the specification, examples and appended claims are collected together in the following section.

I. Definitions

The definitions listed herein should be read in light of the remainder of the disclosure and understood as by a person of skill in the art. Unless defined otherwise, all technical and scientific terms used herein have the same meaning as commonly understood by a person of ordinary skill in the art to which this invention belongs.

"Chemically linked" means connected by an attractive force between atoms strong enough to allow the combined aggregate to function as a unit. This includes, but is not limited to, chemical bonds such as covalent bonds, non-covalent bonds such as ionic bonds, metallic bonds, and bridge bonds, hydrophobic interactions, hydrogen bonds, and van der Waals interactions. This also includes crosslinking or caging.

The term "alkyl" is art-recognized, and includes saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has about 30 or fewer carbon atoms in its backbone (e.g., $C_1$-$C_{30}$ for straight chain, $C_3$-$C_{30}$ for branched chain), and alternatively, about 20 or fewer. Likewise, cycloalkyls have from about 3 to about 10 carbon atoms in their ring structure, and alternatively about 5, 6 or 7 carbons in the ring structure. The term "alkyl" also includes halosubstituted alkyls.

Moreover, the term "alkyl" includes "substituted alkyls", which refers to alkyl moieties having substituents replacing a hydrogen on one or more carbons of the hydrocarbon backbone. Such substituents may include, for example, a hydroxyl, a carbonyl (such as a carboxyl, an alkoxycarbonyl, a formyl, or an acyl), a thiocarbonyl (such as a thioester, a thioacetate, or a thioformate), an alkoxyl, a phosphoryl, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. It will be understood by those skilled in the art that the moieties substituted on the hydrocarbon chain may themselves be substituted, if appropriate. For instance, the substituents of a substituted alkyl may include substituted and unsubstituted forms of amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), —CN and the like. Exemplary substituted alkyls are described below. Cycloalkyls may be further substituted with alkyls, alkenyls, alkoxys, alkylthios, aminoalkyls, carbonyl-substituted alkyls, —CN, and the like.

The terms "aralkyl" and "alkylaryl" are art-recognized and refer to an alkyl group substituted with an aryl group (e.g., an aromatic or heteroaromatic group).

The terms "alkenyl" and "alkynyl" are art-recognized and refer to unsaturated aliphatic groups analogous in length and possible substitution to the alkyls described above, but that contain at least one double or triple bond, respectively.

The term "heteroatom" is art-recognized and refers to an atom of any element other than carbon or hydrogen. Illustrative heteroatoms include boron, nitrogen, oxygen, phosphorus, sulfur and selenium.

The term "aryl" is art-recognized and refers to 5-, 6- and 7-membered single-ring aromatic groups that may include from zero to four heteroatoms, for example, benzene, pyrrole, furan, thiophene, imidazole, oxazole, thiazole, triazole, pyrazole, pyridine, pyrazine, pyridazine and pyrimidine, and the like. Those aryl groups having heteroatoms in the ring structure may also be referred to as "heteroaryl" or "heteroaromatics." The aromatic ring may be substituted at one or more ring positions with such substituents as described above, for example, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —$CF_3$, —CN, or the like. The term "aryl" also includes polycyclic ring systems having two or more cyclic rings in which two or more carbons are common to two adjoining rings (the rings are "fused rings") wherein at least one of the rings is aromatic, e.g., the other cyclic rings may be cycloalkyls, cycloalkenyls, cycloalkynyls, aryls and/or heterocyclyls.

The terms "heterocyclyl," "heterocyclic group" or "heterocyclic moiety" are art-recognized and refer to 3- to about 10-membered ring structures, alternatively 3- to about 7-membered rings, whose ring structures include one to four heteroatoms. Heterocycles may also be polycycles. Heterocyclyl groups include, for example, thiophene, thianthrene, furan, pyran, isobenzofuran, chromene, xanthene, phenoxanthene, pyrrole, imidazole, pyrazole, isothiazole, isoxazole, pyridine, pyrazine, pyrimidine, pyridazine, indolizine, isoindole, indole, indazole, purine, quinolizine, isoquinoline, quinoline, phthalazine, naphthyridine, quinoxaline, quinazoline, cinnoline, pteridine, carbazole, carboline, phenanthridine, acridine, pyrimidine, phenanthroline, phenazine, phenarsazine, phenothiazine, furazan, phenoxazine, pyrrolidine, oxolane, thiolane, oxazole, piperidine, piperazine, morpholine, lactones, lactams such as azetidinones and pyrrolidinones, sultams, sultones, and the like. The heterocyclic ring may be substituted at one or more positions with such substituents as described above, as for example, halogen, alkyl, aralkyl, alkenyl, alkynyl, cycloalkyl, hydroxyl, amino, nitro, sulfhydryl, imino, amido, phosphonate, phosphinate, carbonyl, carboxyl, silyl, ether, alkylthio, sulfonyl, ketone, aldehyde, ester, a heterocyclyl, an aromatic or heteroaromatic moiety, —$CF_3$, —CN, or the like.

The terms "polycyclyl," "polycyclic group" or "polycyclo moiety" are art-recognized and refer to two or more rings (e.g., cycloalkyls, cycloalkenyls, cycloalkynyls, aryls and/or heterocyclyls) in which two or more carbons are common to two adjoining rings, e.g., the rings are "fused rings." Rings that are joined through non-adjacent atoms are termed "bridged" rings. Each of the rings of the polycycle may be substituted with such substituents as described above, as for example, halogen, alkyl, aralkyl, alkenyl, alkynyl, cycloalkyl, hydroxyl, amino, nitro, sulfhydryl, imino, amido, phosphonate, phosphinate, carbonyl, carboxyl, silyl, ether, alkylthio, sulfonyl, ketone, aldehyde, ester, a heterocyclyl, an aromatic or heteroaromatic moiety, —$CF_3$, —CN, or the like.

The term "nitro" is art-recognized and refers to —$NO_2$; the term "halogen" is art-recognized and refers to —F, —Cl, —Br or —I; the term "sulfhydryl" is art-recognized and refers to —SH; the term "hydroxyl" means —OH; and the term "sulfonyl" is art-recognized and refers to —$SO_2$—. "Halide" designates the corresponding anion of the halogens, and "pseudohalide" has the definition set forth in "*Advanced Inorganic Chemistry*" by Cotton and Wilkinson.

The terms "amine" and "amino" are art-recognized and refer to both unsubstituted and substituted amines, e.g., a moiety that may be represented by the general formulas:

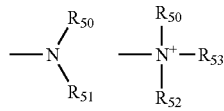

wherein $R_{50}$, $R_{51}$, $R_{52}$ and $R_{53}$ each independently represent a hydrogen, an alkyl, an alkenyl, —$(CH_2)_m$—$R_{61}$, or $R_{50}$ and $R_{51}$, taken together with the N atom to which they are attached complete a heterocycle having from 4 to 8 atoms in the ring structure; $R_{61}$ represents an aryl, a cycloalkyl, a cycloalkenyl, a heterocycle or a polycycle; and m is zero or an integer in the range of 1 to 8. In certain embodiments, only one of $R_{50}$ or $R_{51}$ may be a carbonyl, e.g., $R_{50}$, $R_{51}$ and the nitrogen together do not form an imide. In other embodiments, $R_{50}$ and $R_{51}$ (and optionally $R_{52}$) each independently represent a hydrogen, an alkyl, an alkenyl, or —$(CH_2)_m$—$R_{61}$. Thus, the term "alkylamine" includes an amine group, as defined above, having a substituted or unsubstituted alkyl attached thereto, i.e., at least one of $R_{50}$ and $R_{51}$ is an alkyl group.

The term "acylamino" is art-recognized and refers to a moiety that may be represented by the general formula:

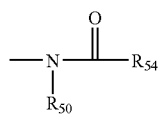

wherein $R_{50}$ is as defined above, and $R_{54}$ represents a hydrogen, an alkyl, an alkenyl or —$(CH_2)_m$—$R_{61}$, where m and $R_{61}$ are as defined above.

The term "amido" is art recognized as an amino-substituted carbonyl and includes a moiety that may be represented by the general formula:

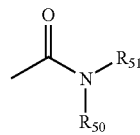

wherein $R_{50}$ and $R_{51}$ are as defined above. Certain embodiments of the amide in the present invention will not include imides which may be unstable.

The term "alkylthio" refers to an alkyl group, as defined above, having a sulfur radical attached thereto. In certain embodiments, the "alkylthio" moiety is represented by one of —S-alkyl, —S-alkenyl, —S-alkynyl, and —S—$(CH_2)_m$—$R_{61}$, wherein m and $R_{61}$ are defined above. Representative alkylthio groups include methylthio, ethylthio, and the like.

The term "carbonyl" is art recognized and includes such moieties as may be represented by the general formulas:

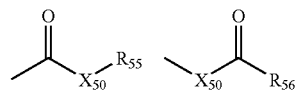

wherein $X_{50}$ is a bond or represents an oxygen or a sulfur, and $R_{55}$ and $R_{56}$ represents a hydrogen, an alkyl, an alkenyl, —$(CH_2)_m$—$R_{61}$ or a pharmaceutically acceptable salt, $R_{56}$ represents a hydrogen, an alkyl, an alkenyl or —$(CH_2)_m$—$R_{61}$, where m and $R_{61}$ are defined above. Where $X_{50}$ is an oxygen and $R_{55}$ or $R_{56}$ is not hydrogen, the formula represents an "ester." Where $X_{50}$ is an oxygen, and $R_{55}$ is as defined above, the moiety is referred to herein as a carboxyl group, and particularly when $R_{55}$ is a hydrogen, the formula represents a "carboxylic acid." Where $X_{50}$ is an oxygen, and $R_{56}$ is hydrogen, the formula represents a "formate." In general, where the oxygen atom of the above formula is replaced by sulfur, the formula represents a "thiolcarbonyl" group. Where $X_{50}$ is a sulfur and $R_{55}$ or $R_{56}$ is not hydrogen, the formula represents a "thiolester." Where $X_{50}$ is a sulfur and $R_{55}$ is hydrogen, the formula represents a "thiolcarboxylic acid." Where $X_{50}$ is a sulfur and $R_{56}$ is hydrogen, the formula represents a "thiolformate." On the other hand, where $X_{50}$ is a bond, and $R_{55}$ is not hydrogen, the above formula represents a "ketone" group. Where $X_{50}$ is a bond, and $R_{55}$ is hydrogen, the above formula represents an "aldehyde" group.

The terms "alkoxyl" or "alkoxy" are art-recognized and refer to an alkyl group, as defined above, having an oxygen attached thereto. Representative alkoxyl groups include methoxy, ethoxy, propyloxy, tert-butoxy and the like. An "ether" is two hydrocarbons covalently linked by an oxygen. Accordingly, the substituent of an alkyl that renders that alkyl an ether is or resembles an alkoxyl, such as may be represented by one of —O-alkyl, —O-alkenyl, —O-alkynyl, —O—$(CH_2)_m$—$R_{61}$, where m and $R_{61}$ are described above.

The term "sulfonate" is art recognized and refers to a moiety that may be represented by the general formula:

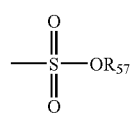

in which $R_{57}$ is an electron pair, hydrogen, alkyl, cycloalkyl, or aryl.

The term "sulfate" is art recognized and includes a moiety that may be represented by the general formula:

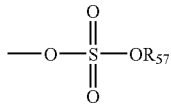

in which $R_{57}$ is as defined above.

The term "sulfonamido" is art recognized and includes a moiety that may be represented by the general formula:

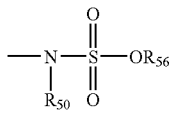

in which $R_{50}$ and $R_{56}$ are as defined above.

The term "sulfamoyl" is art-recognized and refers to a moiety that may be represented by the general formula:

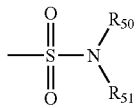

in which $R_{50}$ and $R_{51}$ are as defined above.

The term "sulfonyl" is art-recognized and refers to a moiety that may be represented by the general formula:

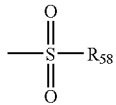

in which $R_{58}$ is one of the following: hydrogen, alkyl, alkenyl, alkynyl, cycloalkyl, heterocyclyl, aryl or heteroaryl.

The term "sulfoxido" is art-recognized and refers to a moiety that may be represented by the general formula:

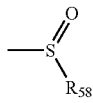

in which $R_{58}$ is defined above.

The term "phosphoryl" is art-recognized and may in general be represented by the formula:

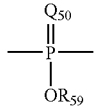

wherein $Q_{50}$ represents S or O, and $R_{59}$ represents hydrogen, a lower alkyl or an aryl. When used to substitute, e.g., an alkyl, the phosphoryl group of the phosphorylalkyl may be represented by the general formulas:

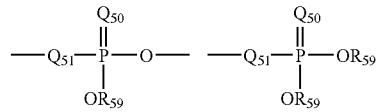

wherein $Q_{50}$ and $R_{59}$, each independently, are defined above, and $Q_{51}$ represents O, S or N. When $Q_{50}$ is S, the phosphoryl moiety is a "phosphorothioate".

The term "phosphoramidite" is art-recognized and may be represented in the general formulas:

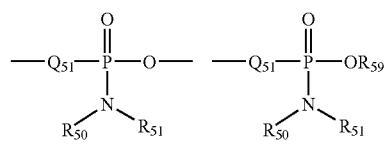

wherein $Q_{51}$, $R_{50}$, $R_{51}$ and $R_{59}$ are as defined above.

The term "phosphonamidite" is art-recognized and may be represented in the general formulas:

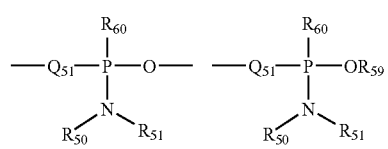

wherein $Q_{51}$, $R_{50}$, $R_{51}$ and $R_{59}$ are as defined above, and $R_{60}$ represents a lower alkyl or an aryl.

Analogous substitutions may be made to alkenyl and alkynyl groups to produce, for example, aminoalkenyls, aminoalkynyls, amidoalkenyls, amidoalkynyls, iminoalkenyls, iminoalkynyls, thioalkenyls, thioalkynyls, carbonyl-substituted alkenyls or alkynyls.

The definition of each expression, e.g., alkyl, m, n, and the like, when it occurs more than once in any structure, is intended to be independent of its definition elsewhere in the same structure.

It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, or other reaction.

The term "substituted" is also contemplated to include all permissible substituents of organic compounds. In a broad aspect, the permissible substituents include acyclic and cyclic, branched and unbranched, carbocyclic and heterocyclic, aromatic and nonaromatic substituents of organic compounds. Illustrative substituents include, for example, those described herein above. The permissible substituents may be one or more and the same or different for appropriate organic compounds. For purposes of this invention, the heteroatoms such as nitrogen may have hydrogen substituents and/or any permissible substituents of organic compounds described herein which satisfy the valences of the heteroatoms. This invention is not intended to be limited in any manner by the permissible substituents of organic compounds. The term "polymethine bridge" refers to a conjugated double bond methylene chain comprising an odd number of carbons. Such a bridge can include a ring structure as part of the conjugated double bond methylene chain.

The term "physiologically acceptable carrier" refers to a carrier in which one or more of the compounds of the invention are dispersed, dissolved, suspended, admixed and physiologically tolerable, i.e., can be administered to, in, or on the subject's body without undue discomfort, or irritation, or toxicity.

Throughout the description, where compositions are described as having, including, or comprising specific components, it is contemplated that compositions also consist essentially of, or consist of, the recited components. Similarly, where processes are described as having, including, or comprising specific process steps, the processes also consist essentially of, or consist of, the recited processing steps. Further, it should be understood that the order of steps or order for performing certain actions are immaterial so long as the invention remains operable. Moreover, two or more steps or actions may be conducted simultaneously.

II. Fluorochrome Compounds of the Invention

As discussed, the compounds of the invention can be represented by the Formula (I)

   (1), and salts thereof.

$Z^1$ and $Z^2$ each independently represent a polycyclic group comprising a heterocyclic moiety. For example, $Z^1$ and $Z^2$ each independently can be selected from a substituted or unsubstituted indolinium or a benzindolinium ring. PMB represents a polymethine bridge comprising a bridged polycyclo moiety. The compounds have an absorption and emission wavelengths in the range from about 500 nm to about 1100 nm, preferably in the range from about 600 nm to about 900 nm. In certain embodiments, the dyes absorb and/or emit light having a wavelength in the range from about 600 nm to about 850 nm, from about 650 nm to about 900 nm, or from about 650 nm to about 850 nm.

$Z^1$, $Z^2$, and/or PMB optionally can include a linker moiety capable of forming a covalent bond, and/or chemical linkage to a biomolecule. Such a linker moiety can include a reactive group that is capable of chemically reacting with a functional group on a different compound to form a covalent linkage, or a functional group that is capable of chemically reacting with a reactive group on different compound to form a covalent linkage. Such a reactive group can include, for example, an electrophile or nucleophile that can form a covalent linkage via exposure to a corresponding functional group that is a nucleophile or electrophile, respectively. Alternatively, the reactive group is a photoactivatable group, and becomes chemically reactive only after illumination with light of an appropriate wavelength. A reaction between the compound of the invention and the biomolecule to be linked can result in one or more atoms of a reactive group incorporated into a new linkage attaching a compound of the invention to the conjugated substance.

Biomolecules contemplated herein include, but are not limited to, proteins (for example, enzymes, hormones, antibodies and antigen binding fragments thereof, and single chain antibodies), peptides, amino acids, glycoproteins, ligands for cell receptors, polysaccharides, carbohydrates, nucleic acids (for example, DNA and RNA), nucleosides, nucleotides, aptamers, peptidyl nucleic acids, cell receptors, enzyme substrates, enzyme cofactors, biotin, hormones, neurotransmitters, growth factors, cytokines, lymphokines, lectins, selectins, lipids, lipid assemblies (for example, micelles or vesicles), and toxins. Other biomolecules can be used, such as those involved in targeting and delivery such as folate-mediated targeting (Leamon & Low, *Drug Discovery Today*, 6:44-51, 2001), transferrin, vitamins, carbohydrates and ligands that target internalizing receptors, including, but not limited to, asialoglycoprotein receptor, somatostatin, nerve growth factor, oxytocin, bombesin, calcitonin, arginine vasopressin, angiotensin II, atrial natriuretic peptide, insulin, glucagons, prolactin, gonadotropin, various opioids and urokinase-type plasminogen activator. Also contemplated are membrane, transmembrane, and nuclear translocation signal sequences, which can be derived from a number of sources including, without limitation, viruses and bacteria. Biomolecules can also include organic molecules, polymers, dendrimers, cells (for example, mammalian cells, non mammalian cells, plant cells, insect cells, embryonic cells), bacteria, bacteriophage, viruses, organisms, particles, microparticles, or nanoparticles. Biomolecules can also include therapeutic drug molecules including but not limited to phototherapy or radiotherapy molecules.

The fluorochrome compounds of the present invention can be used to create one or more of the following types of imaging agents or probes: a molecular probe, an activatable probe, an enzyme-activatable probe, a quantum dot-based imaging probe, a nanoparticle-based imaging probe, a probe targeted to a biomolecule, a wavelength shifting beacon, a multicolor probe, a probe with high binding affinity to a target, a non-specific imaging probe, cell based probe, a dual modality agent, an optical/CT dual modality agent (e.g., an optical agent physically or chemically bound to a CT agent), an optical/MR dual modality agent (e.g., an optical agent physically or chemically bound to an MR agent), an optical/nuclear dual modality agent (e.g., an optical agent physically or chemically bound or with a radioactive atom) and/or any combination thereof.

Compounds of the invention that include a chemically linked biomolecule may have enhanced fluorescence as compared to the compound that is not chemically linked to a biomolecule. In certain embodiments, the fluorescence is enhanced by about 10%, about 25% or about 50% when compared with the unlinked compound. Biomolecules chemically linked to the compounds of the invention may alter or enhance accumulation, biodistribution, elimination, targeting, binding, and/or recognition of the molecules in vivo and/or in vitro.

One or more biomolecules may be chemically linked to $Z^1$, PMB, and/or $Z^2$ via multivalent linkages or linkers containing several reactive functional groups to form a biocompatible fluorescent molecule of the structure $(Z^1\text{-(PMB)-}Z^2)\text{-((L)}_v(BM)_r)_t$, wherein L is a linker or spacer or multivalent spacer or linker, BM is a biomolecule, $Z^1$, $Z^2$ and PMB are as previously defined, and t=1-6, v=1-500 and r=1-500. $(L)_v$, when v is greater than 1, represents copies of the same linker or a combination of different linkers.

Examples of appropriate linker moieties for compounds of the present invention have been previously described in the literature (see, U.S. Patent Appl. 2002/0064794 (2002); U.S. Pat. Nos. 6,086,737; 6,048,982; 6,747,159; and 6,448,008).

It is understood that more than one fluorochrome compound of the present invention can be chemically linked to a single biomolecule. An example of such a structure can be represented as: $[Z^1\text{-(PMB)-}Z^2]_u\text{-BM}$, wherein u=1-500 and $Z^1$, $Z^2$, PMB and BM are as defined above.

Salts of the disclosed compounds are also contemplated, and include both base and acid addition salts. The compounds of the present invention can have one or more sufficiently acidic proton that can react with a suitable organic or inorganic base to form a base addition salt. Base addition salts include those derived from inorganic bases, such as ammonium or alkali or alkaline earth metal hydroxides, carbonates, bicarbonates, and the like, and organic bases such as alkoxides, alkyl amides, alkyl and aryl amines, and the like. Such bases useful in preparing the salts of this invention thus include sodium hydroxide, potassium hydroxide, ammonium hydroxide, potassium carbonate, and the like.

The compounds of the present invention having a sufficiently basic group, such as an amine can react with an organic or inorganic acid to form an acid addition salt. Acids commonly employed to form acid addition salts from compounds with basic groups are inorganic acids such as hydrochloric acid, hydrobromic acid, hydroiodic acid, sulfuric acid, phosphoric acid, and the like, and organic acids such as p-toluenesulfonic acid, methanesulfonic acid, oxalic acid, p-bromophenyl-sulfonic acid, carbonic acid, succinic acid, citric acid, benzoic acid, acetic acid, and the like. Examples of such salts include the sulfate, pyrosulfate, bisulfate, sulfite, bisulfite, phosphate, monohydrogenphosphate, dihydrogenphosphate, metaphosphate, pyrophosphate, chloride, bromide, iodide, acetate, propionate, decanoate, caprylate, acrylate, formate, isobutyrate, caproate, heptanoate, propiolate, oxalate, malonate, succinate, suberate, sebacate, fumarate, maleate, butyne-1,4-dioate, hexyne-1,6-dioate, benzoate, chlorobenzoate, methylbenzoate, dinitrobenzoate, hydroxybenzoate, methoxybenzoate, phthalate, sulfonate, xylenesulfonate, phenylacetate, phenylpropionate, phenylbutyrate, citrate, lactate, gamma-hydroxybutyrate, glycolate, tartrate, methanesulfonate, propanesulfonate, naphthalene-1-sulfonate, naphthalene-2-sulfonate, mandelate, and the like.

For example, compounds of Formula (1) can be represented by:

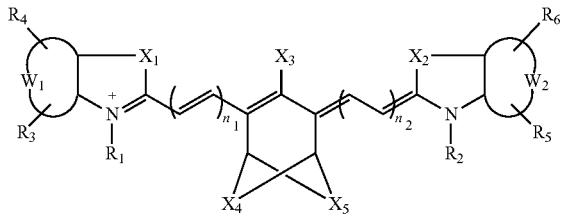

or a salt thereof, wherein:
$X_1$ and $X_2$ each independently are selected from the group consisting of $C(CH_2K_1)(CH_2K_2)$, O, S, and Se;
$K_1$ and $K_2$ each independently are selected from the group consisting of H, halogen, and $C_1$-$C_{20}$ alkyl; wherein $K_1$ and $K_2$ together can optionally form part of a cyclic ring;
$R_1$ and $R_2$ each independently are selected from the group consisting of H, $C_{1-20}$ alkyl, alkylaryl, and —$R_9T_1$;
$R_9$ independently is selected from the group consisting of $C_1$-$C_{20}$ alkyl, aryl, alkylaryl, and —$(CH_2$—O—$CH_2)_yCH_2$;
$T_1$ is a linker moiety capable of forming a covalent bond with a biomolecule;
y is an integer selected from 1 to 100;
$X_3$ is selected from the group consisting of H, halogen, -$T_2R_{10}$, -$T_2R_9T_1$, and —$R_9T_1$;
$T_2$ is selected from the group consisting of S, O, and NR';
$R_{10}$ is selected from the group consisting of H, $C_{1-20}$ alkyl, aryl, arylalkyl;
$X_4$ and $X_5$ each independently are selected from the group $(CK_1K_2)_i$; NR',
—$NR'R_9T_1$, O, and S;
i is an integer selected from 1 to 7;
R' is selected from the group consisting of H, halogen, and alkyl;

$W_1$ and $W_2$ each represent nonmetal atoms as part of an aryl moiety;
$n_1$ and $n_2$ each independently are selected from 0 to 4;
$R_3$, $R_4$, $R_5$ and $R_6$ each independently are selected from the group consisting of H, halogen, carboxylate, carboxylic acid, carboxylic ester, amine, amide, sulfonamide, hydroxyl, O-alkyl, S-alkyl, alkyl, sulfonic acid, sulfonate, a phosphoryl, $SO_2NR_7$-Q-$CHR_8$—[$(CH_2)_m$—Y—$(CH_2)_p$—(O)$_k$]$_h$($CH_2$)$_d T_1$, and —$R_9T_1$;
$R_7$ independently is selected from the group consisting of $C_1$-$C_{20}$ alkyl, aryl; alkylaryl;
$R_8$ independently is selected from the group consisting of H, $C_1$-$C_{20}$ alkyl, aryl and alkylaryl;
$R_7$ and $R_8$, when taken in combination, optionally form a 4-, 5-, 6- or 7-member, optionally substituted, saturated or unsaturated ring;
Q independently is selected from the group consisting of a bond, carbonyl, $C_1$-$C_6$ alkyl, and $C_1$-$C_6$ cycloalkyl;
Y independently is selected from the group consisting of a bond, —$SO_2NR_7$-Q-$CHR_8$—, —O—, —COO—, and —CONR'—;
h is an integer selected from 0 to 70;
k is 0 or 1;
d is an integer from 0 to 12;
m is an integer from 0 to 12; and
p is an integer from 0 to 12.

In certain embodiments, $X_3$ can be selected from the group consisting of: O—$(CH_2)_j$-$T_1$, S—$(CH_2)_j$-$T_1$, O-Ph-$(CH_2)_j$-$T_1$, S-Ph-$(CH_2)_j$-$T_1$, wherein j is an integer from 0 to 6, and Ph is phenyl.

In other embodiments, $T_1$ is selected from the group consisting of —$NH_2$, —OH, —SH, —$SO_3H$, carboxyl, —COCl, —(CO)O(CO)$R_{13}$, —$CONHNH_2$, substituted and unsubstituted N-hydroxysuccinimido esters, substituted and unsubstituted N-hydroxysulfosuccinimido esters, nitro- or fluorophenol esters, azide, —NCS, —CHO, azide, —$COCH_2I$, phosphoramidite, phthalamido, and maleimide, wherein $R_{13}$ is selected from the group consisting of H, alkyl and aryl.

In other embodiments, $X_4$ is —$CH_2$—$CH_2$—, and $X_5$ is selected from the group consisting of —$CH_2$, —$NCH_3$, and —$C(CH_3)_2$.

In other embodiments, $n_1$ and $n_2$ are 1.

In other embodiments, $X_1$ and $X_2$ are —$C(CH_3)_2$.

It is understood that $W_1$ and $W_2$ may be the same or different. For example, $W_1$ and $W_2$ can be selected from the group consisting of:

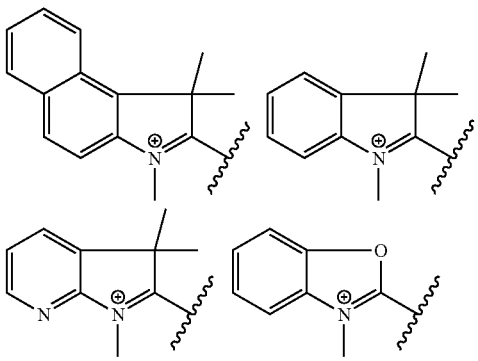

-continued
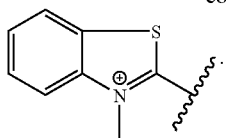
Incorporation of one or more non-hydrogen substituents on the fused rings can be used to tune the absorption and emission spectrum of the resulting dye.
In certain embodiments, the compounds of the present invention can be represented by any one of the formulae 11-22:
11
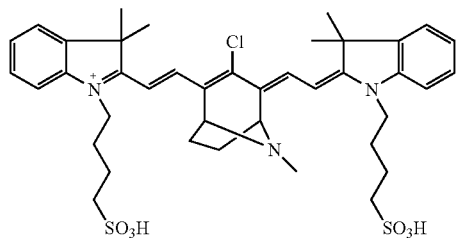
12
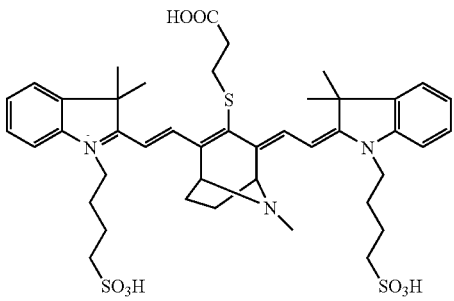
13
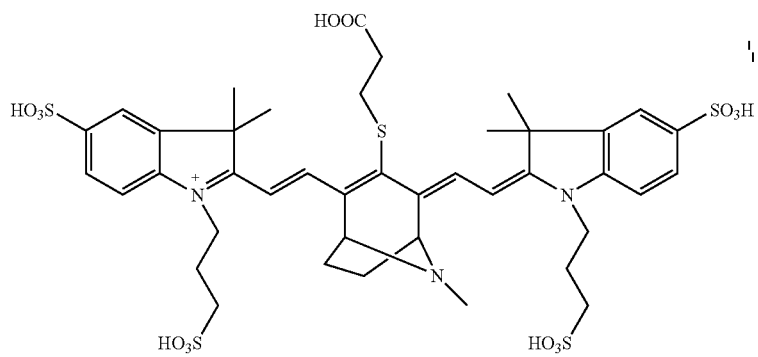
14
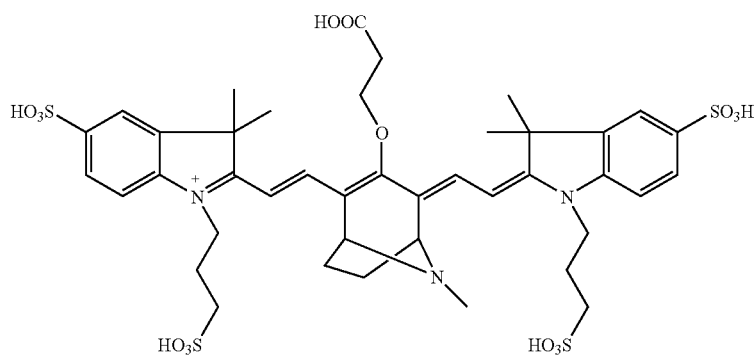
15
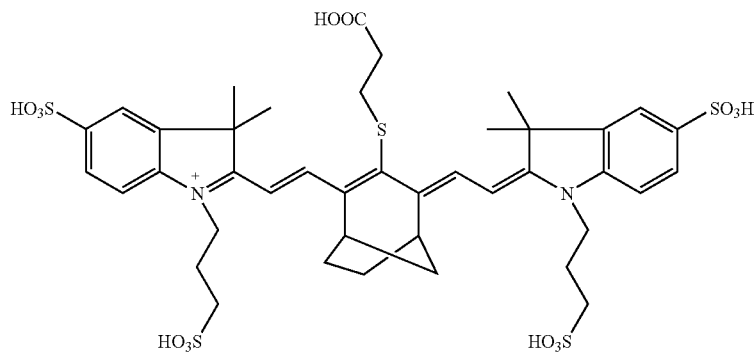

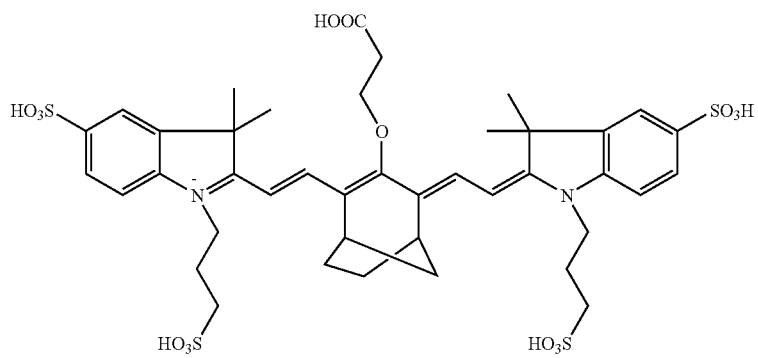
16
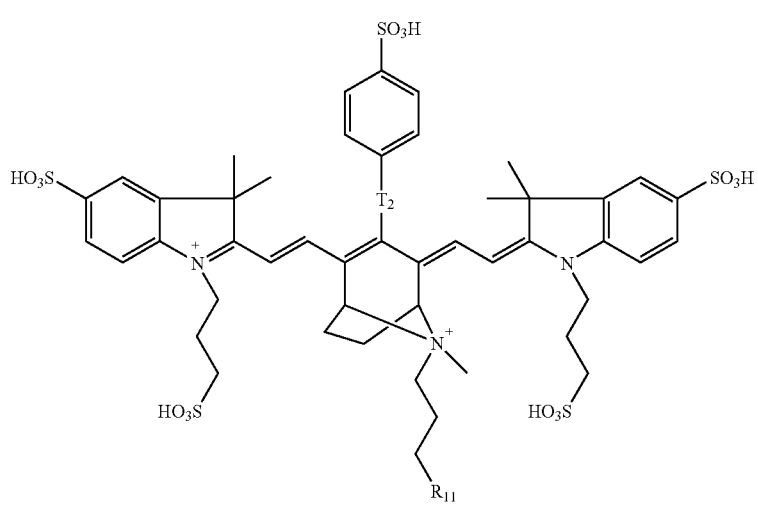
17
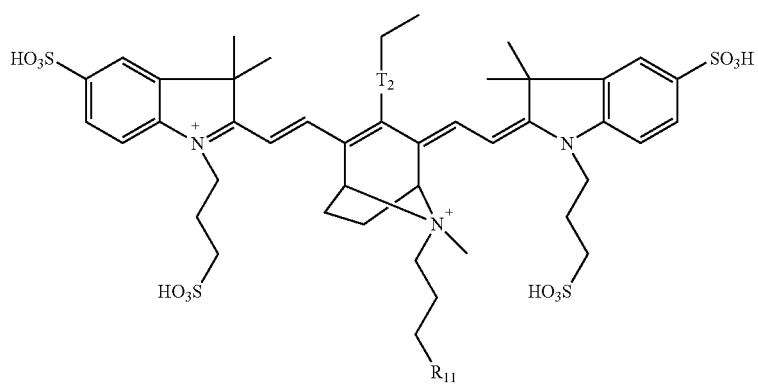
18
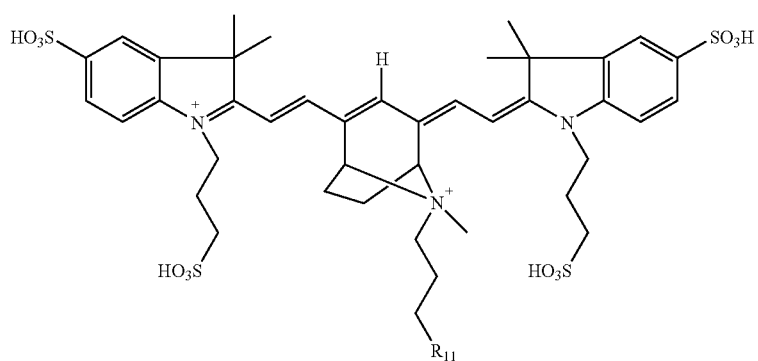
19

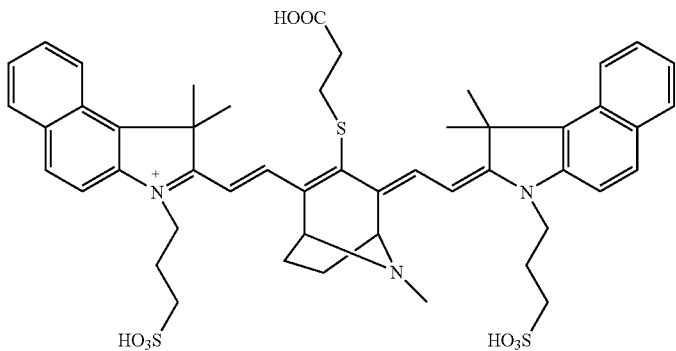

20

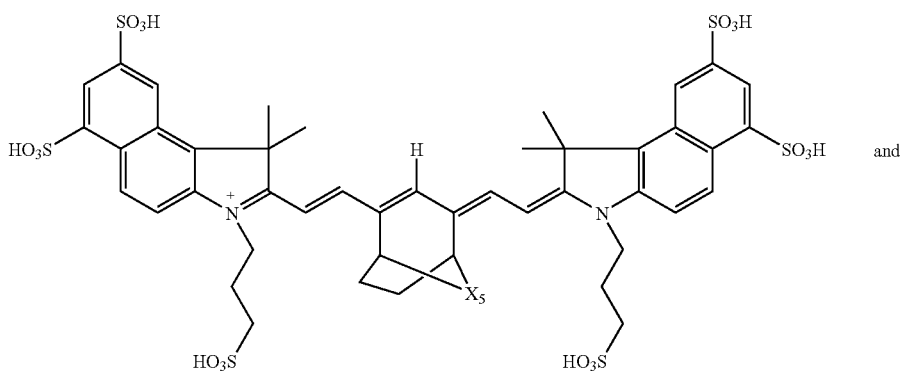

21 and

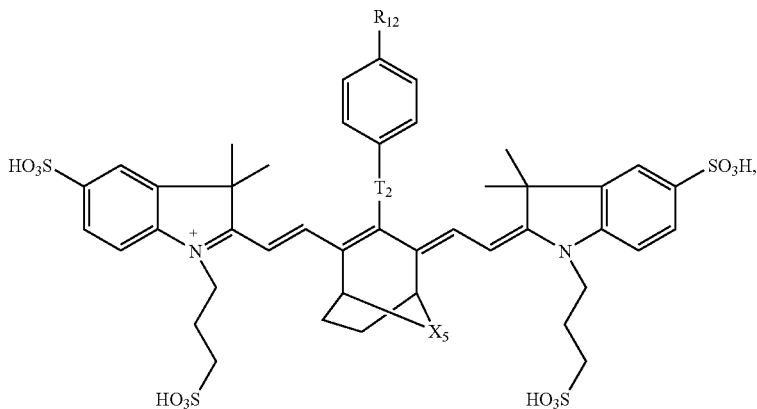

22 wherein $T_2$ is O or S; $X_5$ is N-Me or $CH_2$; $R_{11}$ is selected from the group consisting of $SO_3H$, COOH, OH, SH, and $NH_2$; and $R_{12}$ is selected from the group consisting of: H, $SO_3H$, NCS, $(CH_2)_k COOH$, wherein k is an integer from 0 to 6.

The structure of the polymethine bridge may affect the absorption and fluorescence properties of the fluorochrome. The length of the polymethine bridge, which depends on the number of carbon atoms or the number of double bonds between $Z^1$ and $Z^2$, can cause a change in the absorption and fluorescence properties of the fluorochrome. For example, when $n_1=0$, $n_2=0$, $X_3=H$, and $W_1$ and $W_2$ each are an indolinium heterocycle not fused to additional rings, the resulting fluorochromes typically exhibit an absorption maximum near about 650 nm. Similar compounds, with $n_1=1$, $n_2=1$, typically exhibit an absorption maximum near about 750 nm.

When a compound of the invention is depicted herein by structure indicating the positions of the double bonds in the rings and polymethine bridge, it is to be understood that the structure also encompasses any resonance structures as shown, for example, in the figure below:

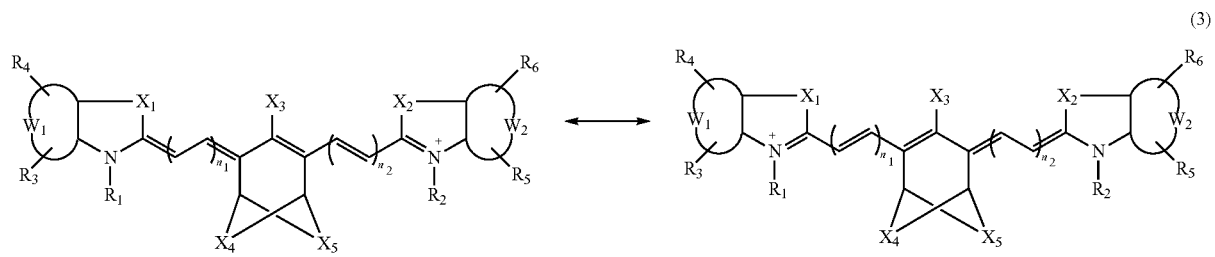

(3)

wherein, in each of the foregoing structures, $R_1$, $R_2$, $R_3$, $R_4$, $R_5$, $R_6$, $W_1$, $W_2$, $X_1$, $X_2$, $X_3$, $X_4$, $X_5$, $n_1$, and $n_2$, are as defined herein.

Generally, the compounds disclosed herein can be synthesized as follows. First, a quaternized heterocycle, $Z^1$, is prepared. Then, the heterocyclic base is reacted with a polymethine bridge (PMB) that is an electrophilic reagent, such as PhNH—PMB—CH=NHPh.HCl, or RO—PMB—CH(OR)$_2$, where PMB includes a conjugated double bond chain, $(CH=CH)_n$—, that includes a polycyclo moiety as part of such chain, and where Ph is a phenyl ring and R a methyl or ethyl group, to obtain hemicyanines such as $Z^1$-PMB—CH=NHPh or $Z^1$-PMB—CH=NAcPh (where Ac is the acetyl radical) or $Z^1$-$(CH=CH)_n$—OR. These intermediates then are reacted with a different quaternary heterocycle, $Z^2$. The functionalized side arm is attached either to the first ($Z^1$) or to the second ($Z^2$) quaternized heterocycle. The final result is a non-symmetric polymethine labeling reagent, $Z^1$-PMB-$Z^2$. Examples of hemicyanine intermediates are described in F. M. Hamer, "Some Unsymmetrical Pentamethincyanine Dyes and their Tetramethin Intermediates", J. Chem. Soc., 32 (1949) and R. B. Mujumdar, L. A. Ernst, Swati R. Mujumdar, C. J. Lewis, and A. S. Waggoner, "Cyanine Dye Labelling Reagents: Sulfoindocyanine Succinimidyl Esters", Bioconjugate Chemistry, 4, 105, (1993).

In another aspect, the invention provides compounds of general structural formulae 40 and 41:

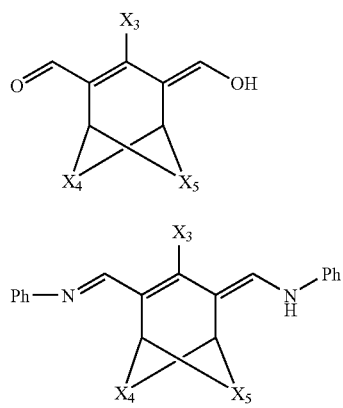

wherein $X_3$, $X_4$ and $X_5$ are as defined above, and Ph is phenyl

In certain embodiments, $X_4$ and $X_5$ are each independently selected from the group consisting of $CH_2$—$CH_2$, NMe, and $CMe_2$.

The certain other embodiments, following structures represented by formulae 42-45 are contemplated:

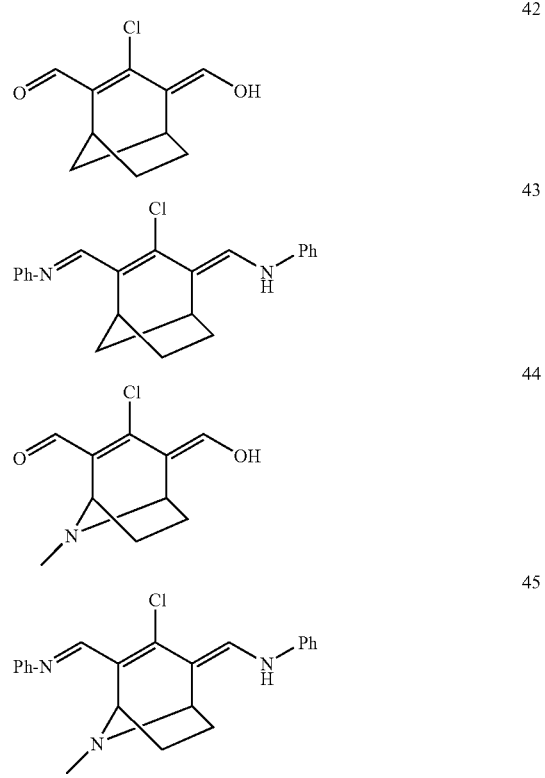

In certain embodiments, the compounds of the invention can be chemically linked to a biological molecule or biomolecule (BM). The resulting compound-biomolecule conjugate can have a high binding affinity to a target, for example, due to an interaction between the biological molecule and the target, for example, via a receptor-ligand interaction, enzyme-substrate interaction, an antibody-antigen interaction, or the like. Such chemically linked compounds, of the general form $[Z^1$-(PMB)-$Z^2]$—BM, can be represented, for example, as:

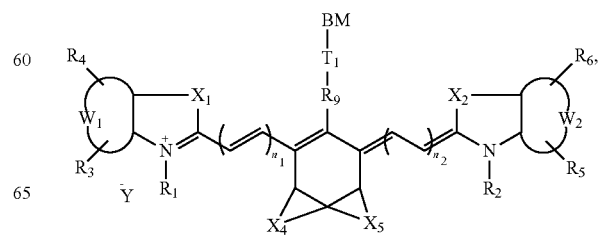

-continued

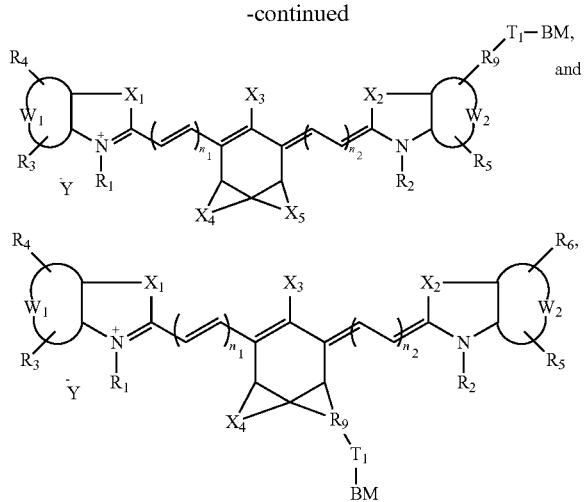

wherein, in each of the foregoing structures, $R_1$, $R_2$, $R_3$, $R_4$, $R_5$, $R_6$, $R_9$, $W_1$, $W_2$, $X_1$, $X_2$, $X_3$, $X_4$, $X_5$, $T_1$, $n_1$, and $n_2$, are as defined herein, $Y^-$ is a counterion, and BM is a biomolecule. The foregoing structures are exemplary and it is understood that a biomolecule (BM) can be chemically linked to such compound via any one or more of the groups identified as $R_1$, $R_2$, $R_3$, $R_4$, $R_5$, $R_6$, $R_9$, $W_1$, $W_2$, $X_1$, $X_2$, $X_3$, $X_4$, $X_5$, and $T_1$.

The compounds can be labeled with biomolecules or cells as follows. The compounds (fluorochromes) of the present invention are incubated with one or more biomolecules at various concentrations for about 5 minutes to 24 hours or more at a temperature from about 4° C. to about 37° C. After the incubation, the free fluorochrome or the fluorochrome that has not been chemically linked to the biomolecule can be removed using methods known to those skilled in art, such as for example, chromatography or ultrafiltration methods.

Cells can be centrifuged after incubation to create a cell pellet from which the supernatant is removed. Cells can be resuspended in culture media or physiologic saline to wash away residual, unbound or free fluorochrome. This can be repeated several times. In this manner, cells can be labeled either by direct conjugation to internal or external cellular molecules or by non-specific cell uptake into various intracellular compartments, including but not limited to cytosol, endosomes, nucleus, golgi apparatus, and other intracellular organelles.

The disclosed compounds and/or compositions can be packaged as a kit, which may optionally include instructions for using the compounds. Non-limiting examples include kits that contain, for example, a composition in a powder or lyophilized form, and instructions for using, including reconstituting, dosage information, and storage information for in vivo and/or in vitro applications. Kits may optionally contain containers of a composition in a liquid form ready for use, or requiring further mixing with solutions for administration, such as vials for reconstituting powder forms, syringes for injection, customized IV delivery systems, inhalers, etc. Such containers may contain single or multiple subject doses. Additionally, a kit can contain components that aid in the detection of the compositions in vivo or in vitro, for example, specialized endoscopes, light filters.

Compounds disclosed herein, including those compounds chemically linked to a biomolecule, can be formulated in a pharmaceutical composition suitable for administration to a subject, for example, an animal or human subject. Accordingly, the formulations include the compounds together with a physiologically acceptable carrier suitable for the desired form and/or dose of administration. Physiologically acceptable carriers can include water, saline, and may further include agents such as buffers, and other agents such as preservatives that are compatible for use in pharmaceutical formulations. The preferred carrier is a fluid, preferably a liquid, more preferably an aqueous solution; however, carriers for solid formulations, topical formulations, inhaled formulations, ophthalmic formulations, and transdermal formulations are also contemplated as within the scope of the invention.

In addition, the pharmaceutical compositions can include one or more stabilizers in a physiologically acceptable carrier. Suitable example of stabilizers for use in such compositions include, for example, low molecular weight carbohydrates, for example a linear polyalcohol, such as sorbitol, and glycerol. Other low molecular weight carbohydrates, such as inositol, may also be used.

It is contemplated that the compounds of the invention can be administered orally or parenterally. For parenteral administration, the compounds can be administered intravenously, intramuscularly, cutaneously, percutaneously, subcutaneously, rectally, nasally, vaginally, and ocularly. Thus, the composition may be in the form of, e.g., solid tablets, capsules, pills, powders including lyophilized powders, colloidal suspensions, microspheres, liposomes granulates, suspensions, emulsions, solutions, gels, including hydrogels, pastes, ointments, creams, plasters, irrigation solutions, drenches, osmotic delivery devices, suppositories, enemas, injectables, implants, sprays, or aerosols. The pharmaceutical compositions can be formulated according to conventional pharmaceutical practice (see, for example, Remington: The Science and Practice of Pharmacy, 20th edition, 2000, ed. A. R. Germaro, Lippincott Williams & Wilkins, Philadelphia, and Encyclopedia of Pharmaceutical Technology, eds. J. Swarbrick and J. C. Boylan, 1988-1999, Marcel Dekker, New York).

III Applications of the Fluorochrome Compounds of the Invention

The compounds of the invention can be used in a variety of in vivo and in vitro applications. These applications are discussed in the following sections.

(a) In Vivo Applications

The invention provides novel fluorescent compounds that can be used in a variety of imaging applications, for example, optical imaging applications. For a review of optical imaging techniques, see, e.g., Alfano et al., Ann. NY Acad. Sci. 820: 248-270, 1997; Weissleder, Nature Biotechnology 19, 316-317 (2001); Ntziachristos et al., Eur. Radiol. 13:195-208 (2003); Graves et al., Curr. Mol. Med. 4:419-430 (2004); Citrin et al., Expert Rev. Anticancer Ther. 4:857-864 (2004); Ntziachristos, Ann. Rev. Biomed. Eng. 8:1-33 (2006); Koo et al., Cell Oncol. 28:127-139 (2006); and Rao et al., Curr. Opin. Biotechnol. 18:17-25 (2007).

An imaging system useful in the practice of this invention typically includes three basic components: (1) an appropriate light source for exciting the fluorochrome compounds of the invention, (2) a system for separating or distinguishing emissions from light used for inducing fluorochrome excitation, and (3) a detection system. This detection system can be hand-held or incorporated into other useful imaging devices such as endoscopes, catheters, intraoperative microscopes and/or viewers.

Preferably, the light source provides monochromatic (or substantially monochromatic) light. The light source can be a suitably filtered white light, i.e., bandpass light from a broadband source. For example, light from a 150-watt halogen lamp can be passed through a suitable bandpass filter commercially available from Omega Optical (Brattleboro, Vt.). Depending upon the system, the light source can be a laser. See, e.g., Boas et al., *Proc. Natl. Acad. Sci.* USA 91:4887-4891, 1994; Ntziachristos et al., *Proc. Natl. Acad. Sci. USA* 97:2767-2772, 2000; and Alexander, *J. Clin. Laser Med. Surg.* 9:416-418, 1991. Information on lasers for imaging can be found, for example, at Imaging Diagnostic Systems, Inc., Plantation, Fla. and various other sources. A high pass or bandpass filter can be used to separate optical emissions from excitation light. A suitable high pass or bandpass filter is commercially available from Omega Optical, Burlington, Vt.

In general, the light detection system can be viewed as including a light gathering/image forming component and a light detection/image recording component. Although the light detection system can be a single integrated device that incorporates both components, the light gathering/image forming component and light detection/image recording component are discussed separately.

A particularly useful light gathering/image forming component is an endoscope. Endoscopic devices and techniques which have been used for in vivo optical imaging of numerous tissues and organs, including peritoneum (Gahlen et al., *J. Photochem. Photobiol. B* 52:131-135, 1999), ovarian cancer (Major et al., *Gynecol. Oncol.* 66:122-132, 1997), colon and rectum (Mycek et al., *Gastrointest. Endosc.* 48:390-394, 1998; and Stepp et al., *Endoscopy* 30:379-386, 1998), bile ducts (Izuishi et al., *Hepatogastroenterology* 46:804-807, 1999), stomach (Abe et al., *Endoscopy* 32:281-286, 2000), bladder (Kriegmair et al., *Urol. Int.* 63:27-31, 1999; and Riedl et al., *J. Endourol.* 13:755-759, 1999), lung (Hirsch et al., *Clin Cancer Res* 7:5-220, 2001), brain (Ward, *J. Laser Appl.* 10:224-228, 1998), esophagus, and head and neck regions can be employed in the practice of the present invention.

Other types of light gathering components are catheter-based devices, including fiber optics devices. Such devices are particularly suitable for intravascular imaging. See, for example, Tearney et al., *Science* 276: 2037-2039, 1997; and *Circulation* 94: 3013, 1996.

Still other imaging technologies, including phased array technology (Boas et al., *Proc. Natl. Acad. Sci. USA* 91:4887-4891, 1994; Chance, *Ann. NY Acad. Sci.* 838:29-45, 1998), optical tomography (Cheng et al., *Optics Express* 3:118-123, 1998; and Siegel et al., *Optics Express* 4:287-298, 1999), intravital microscopy (Dellian et al., *Br. J. Cancer* 82:1513-1518, 2000; Monsky et al, *Cancer Res.* 59:4129-4135, 1999; and Fukumura et al., *Cell* 94:715-725, 1998), confocal imaging (Korlach et al., *Proc. Natl. Acad. Sci. USA* 96:8461-8466, 1999; Rajadhyaksha et al., *J. Invest. Dermatol.* 104:946-952, 1995; and Gonzalez et al., *J. Med.* 30:337-356, 1999) and fluorescence molecular tomography (FMT) (Nziachristos et al., *Nature Medicine* 8:757-760, 2002; U.S. Pat. No. 6,615,063, PCT Application No. WO 03/102558, and PCT US/03/07579) can be used with the fluorochrome compounds of the invention. Similarly, the fluorochrome compounds can be used in a variety of imaging systems, for example, [1] the IVIS® Imaging Systems: 100 Series, 200 Series (Xenogen, Alameda, Calif.), [2] SPECTRUM and LUMINA (Xenogen, Alameda, Calif.), [3] the SoftScan® or the eXplore Optix™ (GE Healthcare, United Kingdom), [4] Maestro™ and Nuance™-2 Systems (CRi, Woburn, Mass.), [5] Image Station In-Vivo FX from Carestream Molecular Imaging, Rochester, N.Y. (formerly Kodak Molecular Imaging Systems), [6] OV100, IV100 (Olympus Corporation, Japan), [7] Cellvizio Mauna Kea Technologies, France) [8] NanoSPECT/CT or HiSPECT (Bioscan, Washington, D.C.), [9] CTLM® or LILA™ (Imaging Diagnostic Systems, Plantation, Fla.), [10] DYNOT™ (NIRx Medical Technologies, Glen Head, N.Y.) and [11] NightOWL Imaging Systems by Berthold Technologies, Germany.

A variety of light detection/image recording components, e.g., charge coupled device (CCD) systems or photographic film, can be used in such systems. The choice of light detection/image recording depends on factors including the type of light gathering/image forming component being used. It is understood, however, that the selection of suitable components, assembling them into an optical imaging system, and operating the system is within ordinary skill in the art.

Optical imaging and measurement techniques include, but are not limited to, fluorescence imaging, luminescence imaging; endoscopy; fluorescence endoscopy; optical coherence tomography; transmittance imaging; time resolved transmittance imaging; confocal imaging; nonlinear microscopy; photoacoustic imaging; acousto-optical imaging; spectroscopy; reflectance spectroscopy; intravital imaging; two photon imaging; interferometry; coherence interferometry; diffuse optical tomography and fluorescence molecular tomography.

It is contemplated that the fluorochrome compounds of the injection can be coupled to or incorporated within a solid support, for example, a particle. Accordingly, it is understood that the fluorochrome compounds can be coupled to metal oxide nanoparticles that have magnetic properties to produce particles that are also fluorescent. Accordingly, the resulting particles can also be used in MRI imaging using techniques known in the art. For a review of MRI techniques see Westbrook, Handbook of MRI Technique, $2^{nd}$ Edition, 1999, Blackwell Science. It is possible that images obtained, for example, by fluorescent molecular tomography and by magnetic resonance imaging can be co-registered or fused with one another to provide additional information about the item being imaged. Furthermore, multi-modality imaging systems (i.e., combined optical and MR imaging systems) can be used to create combined optical MR images.

In addition, the compositions and methods of the present invention can be used in combination with other imaging compositions and methods. For example, the fluorochrome compounds of the invention can be used to image regions of interest via optical imaging protocols either alone or in combination with other traditional imaging modalities, such as, X-ray, computed tomography (CT), MR imaging, ultrasound, positron emission tomography (PET), and single photon computerized tomography (SPECT). For instance, the compositions and methods of the present invention can be used in combination with CT or MR imaging to obtain both anatomical and molecular information simultaneously, for example, by co-registration of an image generated by another imaging modality. The compositions and methods of the present invention can also be used in combination with X-ray, CT, PET, ultrasound, SPECT, MR and other optical contrast agents or alternatively, the fluorochrome compounds of the present invention may also contain imaging agents, such as iodine, gadolinium atoms and radioactive isotopes, which can be detected using CT, PET, SPECT, and MR imaging modalities in combination with optical imaging.

An exemplary method of in vivo optical imaging comprises the steps of (a) administering to a subject, for example, a human or an animal, a fluorescent compound of the present invention; (b) allowing sufficient time for the fluorochrome compound to distribute within the subject or to contact or interact with a biological target; (c) exposing the subject to electromagnetic radiation, for example, light of a wavelength absorbable by the fluorochrome compound; and (d) detecting an optical signal emitted by the fluorochrome compound.

It is understood that the subject may be a vertebrate animal, for example, a mammal, including a human. The animal may also be non-vertebrate, (e.g., *C. elegans, drosophila*, or other model research organisms, etc.). The biological target can include, without limitation, cells, cell culture, tissues, tissue sections, organs, organ sections, cytospin samples, proteins, nucleic acids, carbohydrates, lipids, or the like.

The foregoing steps, including, for example, steps (a)-(d), can be repeated at predetermined time intervals thereby to permit evaluation of the emitted signals of the fluorochrome compounds in the subject over time. The illuminating and detecting steps (steps (c) and (d), respectively) can be performed using a planar imaging system, endoscope, catheter, tomographic system, hand-held optical imaging system, goggles, or an intraoperative microscope. The signal emitted by the fluorochrome compound can be used to construct an image, for example, a tomographic image.

Before or during these steps, a detection system can be positioned around or in the vicinity of a subject (for example, an animal or a human) to detect optical and/or other signals (e.g., MR, nuclear, X-ray) emitted from the subject. The emitted optical and/or other signals can be processed to construct an image, for example, a tomographic or planar image. In addition, the processed signals can be displayed as images either alone or as fused (combined) images.

In addition, it is possible to practice an in vivo imaging method that selectively detects and images one or more imaging agents simultaneously. In such an approach, for example, in step (a) noted above, two or more imaging agents whose signal properties are distinguishable from one another are administered to the subject, either at the same time or sequentially, wherein at least one of the imaging agents contains a fluorochrome compound of the invention. The use of multiple agents permits the recording of multiple biological processes, functions or targets.

The invention also features an in vivo imaging method where labeled cells are administered to the subject. The cells can be labeled with the fluorochrome compound ex vivo. The cells can be derived directly from a subject or from another source (e.g., from another subject, cell culture, etc.). The fluorochrome compound can be mixed with the cells to effectively label the cells and the resulting labeled cells administered into a subject in step (a). Steps (b)-(d) then are followed as described above. This method can be used for monitoring trafficking and localization of certain cell types, including T-cells, tumor cells, immune cells and stem cells, and other cell types. In particular, this method may be used to monitor cell-based therapies.

It is understood that the formulation of the fluorochrome compounds, the choice of mode of administration, the dosages of fluorochrome compounds administered to the subject, and the timing between administration of the fluorochrome compounds and their exposure of to light (and also other forms of electromagnetic radiation if appropriate under the circumstances) is within the level of skill in the art.

The methods of the invention can be used to determine a number of indicia, including tracking the localization of the fluorochrome compounds in the subject over time or assessing changes or alterations in the metabolism and/or excretion of the fluorochrome compounds in the subject over time. The methods can also be used to follow therapy for such diseases by imaging molecular events and biological pathways modulated by such therapy, including but not limited to determining efficacy, optimal timing, optimal dosing levels (including for individual patients or test subjects), and synergistic effects of combinations of therapy.

The methods and compositions of the invention can also be used to help a physician or surgeon to identify and characterize areas of disease, such as arthritis, cancers and specifically colon polyps, or vulnerable or unstable plaque, to distinguish diseased and normal tissue, such as detecting tumor margins that are difficult to detect using an ordinary operating microscope, e.g., in brain surgery, to help dictate a therapeutic or surgical intervention, for example, by determining whether a lesion is cancerous and should be removed or non-cancerous and left alone, or in surgically staging a disease, e.g., intraoperative lymph node staging, sentinel lymph node mapping, or assessing intraoperative bleeding or to delineate tumor margins.

The methods and compositions of the invention can also be used in the detection, characterization and/or determination of the localization of a disease, especially early disease, the severity of a disease or a disease-associated condition, the staging of a disease, and/or monitoring a disease. The presence, absence, or level of an emitted signal can be indicative of a disease state. The methods and compositions of the invention can also be used to monitor and/or guide various therapeutic interventions, such as surgical procedures, and monitoring drug therapy, including cell based therapies. The methods of the invention can also be used in prognosis of a disease or disease condition.

With respect to each of the foregoing, examples of such disease or disease conditions that can be detected or monitored (before, during or after therapy) include, for example, inflammation (e.g., inflammation caused by arthritis, for example, rheumatoid arthritis), cancer (e.g., colorectal, ovarian, lung, breast, prostate, cervical, testicular, skin, brain, gastrointestinal, pancreatic, liver, kidney, bladder, stomach, leukemia, mouth, esophageal, bone), cardiovascular disease (e.g., atherosclerosis and inflammatory conditions of blood vessels, ischemia, stroke, thrombosis, disseminated intravascular coagulation), dermatologic disease (e.g., Kaposi's Sarcoma, psoriasis, allergic dermatitis), ophthalmic disease (e.g., macular degeneration, diabetic retinopathy), infectious disease (e.g., bacterial, viral, fungal and parasitic infections, including Acquired Immunodeficiency Syndrome, malaria, Chagas disease, schistosomiasis), immunologic disease (e.g., an autoimmune disorder, lymphoma, multiple sclerosis, rheumatoid arthritis, diabetes mellitus, lupus erythematosis, myasthenia gravis, Graves disease), central nervous system disease (e.g., a neurodegenerative disease, such as Parkinson's disease, Alzheimer's disease, Huntington's disease, amyotrophic lateral sclerosis, prion disease), inherited diseases, metabolic diseases, environmental diseases (e.g., lead, mercury and radioactive poisoning, skin cancer), bone-related disease (e.g., osteoporosis, primary and metastatic bone tumors, osteoarthritis), neurodegenerative disease, and surgery-related complications (such as graft rejection, organ rejection, alterations in wound healing, fibrosis, or other complications related to surgical implants).

The methods and compositions of the invention, therefore, can be used, for example, to determine the presence and/or localization of tumor cells, the presence and/or localization of inflammation, including the presence of activated macrophages, for instance in atherosclerosis or arthritis, the presence and in localization of vascular disease including areas at risk for acute occlusion (i.e., vulnerable plaques) in coronary and peripheral arteries, regions of expanding aneurysms, unstable plaque in carotid arteries, and ischemic areas. The disclosed methods of the invention can be used, for example, in identification and evaluation of apoptosis, necrosis, hypoxia and angiogenesis. Alternatively, the disclosed methods may also be used to assess the effect of a therapeutic compound or therapy on a specified molecular target by, for example, imaging a subject prior to and after treatment with the therapeutic compound or therapy, and comparing corresponding images.

(b) In Vitro Applications

In addition, it is appreciated that the fluorochrome compounds can be used in a variety of in vitro assays, for example, binding experiments, and in vitro imaging experiments. It is understood that the imaging technologies discussed in the previous section are also applicable to in vitro imaging experiments.

An exemplary in vitro imaging method comprises: (a) contacting a sample with a probe comprising a fluorochrome compound of the invention; (b) allowing the fluorochrome compound to (i) become activated by and/or (ii) bind to a biological target; (c) optionally removing unactivated or unbound fluorochrome compound; (d) exposing the sample to electromagentic radiation, for example, light, of a wavelength absorbable by the fluorochrome compound; and (e) detecting signal emitted from the fluorochrome compounds thereby to determine whether the probes have been activated or bound by the biological target.

The sample can be a liquid or solid sample containing, for example, primary cells, cell cultures, or tissue. The biological target can be, for example, a cell, an aggregation of cells, a tissue or tissue sample, a structure (both on the macrocellular level (for example, bone or tissue) or on a subcellular level (for example, a mitochrondria or nucleus)), and a cellular component, for example, a protein (for example, an enzyme or structural protein), lipid, nucleic acid or polysaccharide.

The fluorochrome compounds can be used in a variety of in vitro ligand binding assays such, when incorporated into magnetic particles, can be used in magnetic detection based assays (see, U.S. Pat. Nos. 6,046,585 and 6,275,031, 5,445,970; 4,219,335, Chemla, et. al. (2000) Proc Natl Acad. Sci USA 97, 14268-72). They can also be used in magnetic resonance based ligand binding assays such as those described in U.S. Pat. No. 5,164,297 and Perez et al. Nature Biotechnol. 2002, 20(8):816-20. The fluorochrome compounds can also be used for cell sorting and counting applications.

The fluorochrome compounds can also be used as reporter groups in a nucleic acid-based assays. For example, the fluorochrome compounds can be coupled to nucleic acids, for example, DNA or RNA, modified nucleic acids, PNAs, molecular beacons, or other nucleic acid binding molecules (for example, small interfering RNA or siRNA) for use in hybridization assays, for example, in situ hybridization assays, sequencing reactions, amplification reactions, for example, real-time polymerase chain reaction amplification reactions. For example, for detecting a single stranded nucleic acid (i.e., mRNA, cDNA or denatured double-stranded DNA) in a sample via nucleic acid hybridization principles, a fluorochrome compound of the invention is chemically linked to a single-stranded nucleic acid (probe) and contacted with a sample suspected of containing one or more single stranded nucleic acids (target nucleic acids), optionally immobilized on a solid support. The probe is incubated with the sample under conditions to permit the probe to hybridize to target nucleic acid in the sample to form a duplex. Unbound probe can be removed by washing, and the bound probe can be detected, wherein the presence or level of fluorescence emitted by the fluorochrome compound in the probe is indicative of the presence or amount of the target nucleic acid in the sample.

The invention will now be illustrated by means of the following examples, which are given for the purpose of illustration only and without any intention to limit the scope of the present invention.

EXAMPLES

Representative materials and methods that may be used in preparing the compounds of the invention are described further below. All commercially available chemicals and solvents (reagent grade) are used as supplied without further purification in general. Analytical and preparative HPLC methods include:

A Column: Agilent Zorbax 80 Å, Extend C18, 4.6×250 mm (5 μm).

Mobile phase: Acetonitrile, 25 mM triethylammonium acetate.

B Column: Varian Dynamax, 100 Å, C18, 41.4×250 mm.

Mobile phase: Acetonitrile, 25 mM triethylammonium acetate.

C Column: Phenomenex Jupiter, 300 Å, C18

Mobile phase: Acetonitrile, 25 mM triethylammonium acetate.

Example 1

Synthesis of Compound 12

Compound 12 was synthesized according to the following scheme (Scheme 1).

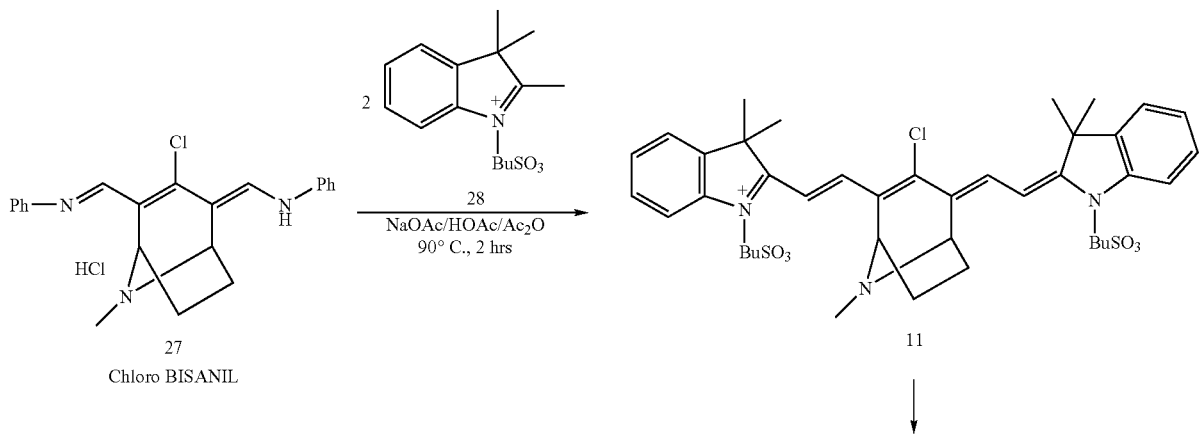

-continued

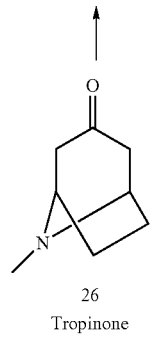

26
Tropinone

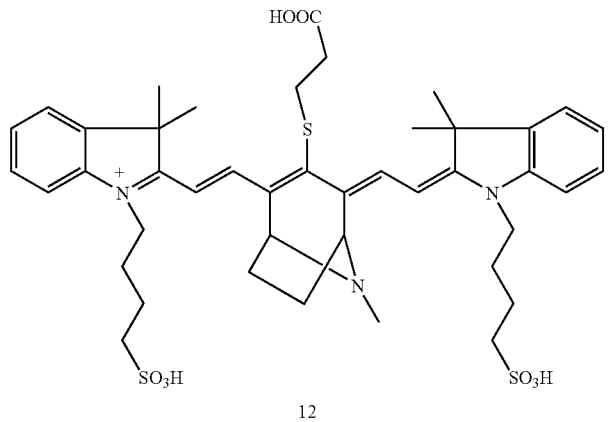

12

A. Preparation of Compound 27

2 mL POCl$_3$ was added dropwise to 3 mL DMF cooled at 0° C. over two minutes. After stirring for five minutes, 1 g of tropinone 26 in 2 mL DMF was added over a period of 10 minutes. An instant bright orange color developed. After stirring at 0° C. for 30 minutes, the cooling bath was removed and the reaction mixture allowed to warm up to room temperature over 30 minutes, and then heated to 70° C. on a water bath. After 3 hours, the reaction mixture was cooled to room temperature and 1.4 mL aniline in 3 mL ethanol was added with cooling on ice. The mixture was subsequently poured into 30 g ice containing 2 mL concentrated hydrochloric acid (HCl) in a beaker. The mixture was stirred well and stored at 4° C. overnight. The precipitate of Compound 27 was collected by centrifuging the brown solution. The residue was washed gently with 50% aqueous ethanol and dried under vacuum to produce 1.0 g of product in a 35% yield.

B. Preparation of Quaternary Salt (28)

A mixture of 20 mmol of 2,3,3 trimethyl indolinine and 25 mmol of butane sultone was heated in 20 mL of 1,2 dichlorobenzene in a sealed tube at 125° C. for 8 hours. After decanting the organic solvent, the residue was repeatedly precipitated from methanol-acetone until a pale pink free flowing powder of quaternary salt 28 was obtained in 75-80% yield.

C. Preparation of Compound 11

120 mg of quaternary salt 28 (0.4 mmol) and 80 mg of the chlorobisanil 27 (0.2 mmol) were mixed in a 15 mL glass tube. 2 mL of acetic acid, 2 mL of acetic anhydride and 82 mg of sodium acetate (1 mmol) were added. The tube was sealed and heated at 110° C. for 3 hours, during which time the reaction mixture slowly turned green. After cooling, 5 mL ethyl acetate was added to the reaction mixture, which precipitated the crude dye as a dark residue. The dark residue was purified on a semi-prep RPC18 HPLC column. Speed vac drying of the HPLC fraction afforded 110 mg of Compound 11, in 71% yield, and was identified by MALDI. Calculated for K salt (C$_{40}$H$_{51}$ClKN$_3$O$_6$S$_2$) 808.53; Observed 808.81. Abs. max: 760 nm (water), 770 nm (MeOH); Em. max: 775 nm (water), 790 nm (MeOH).

D. Preparation of Compound 12

110 mg of Compound 11 was dissolved in 1 mL of DMF to which was added 25 µL of mercaptopropionic acid and 5 µL of triethylamine in a 2 mL tube. The contents were stirred at room temperature overnight. Analysis of the reaction mixture by HPLC revealed complete conversion of Compound 11 to Compound 12. The product was isolated by repeated precipitation in DMF-ethyl acetate. Yield 80 mg, 69%. Identified by MALDI: Calculated for C$_{43}$H$_{57}$N$_3$O$_8$S$_3$$^+$: 840.12; Observed 841.70. Abs. max: 768 nm (water), 780 nm (MeOH); Em. max: 787 nm (water), 810 nm (MeOH).

Example 2

Synthesis of Compound 15

Compound 15 was prepared as described in the following scheme (Scheme 2).

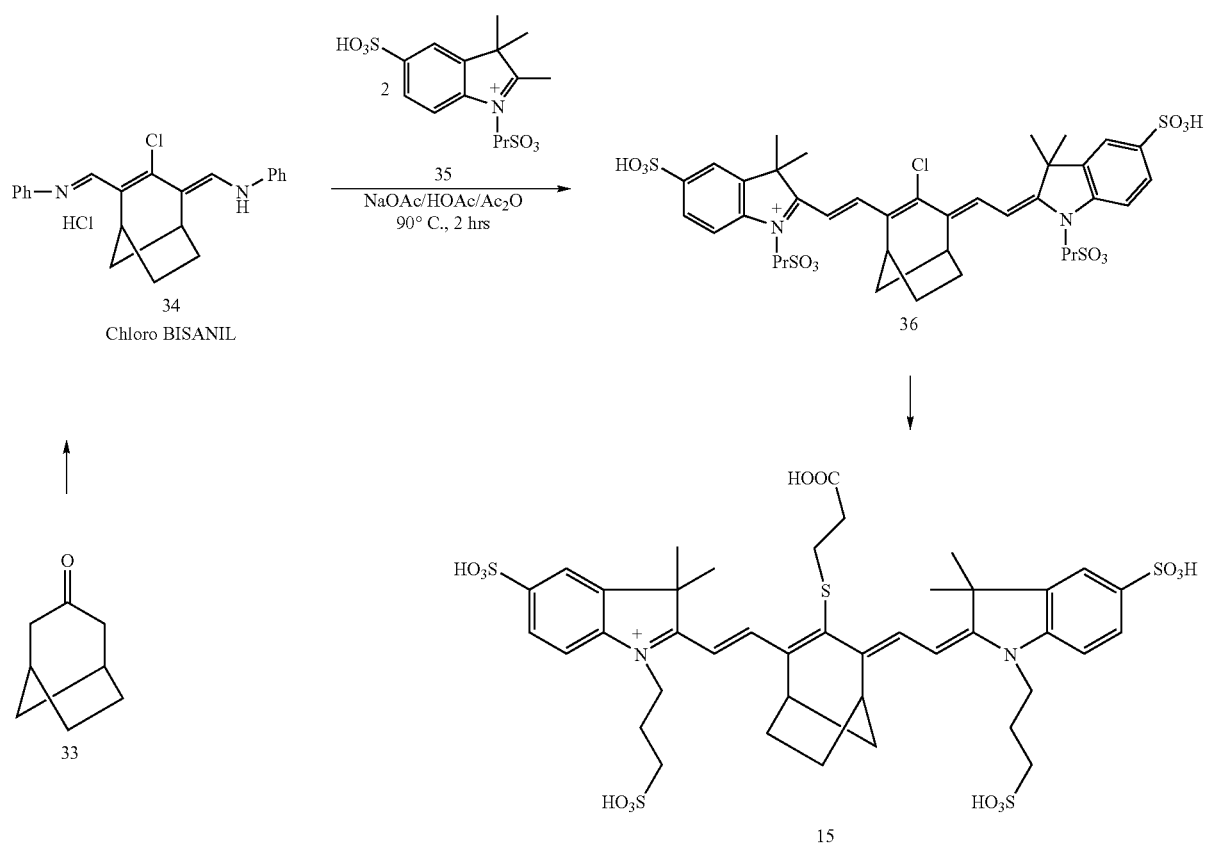

A. Preparation of Compound 33

Compound 33 was synthesized according to the literature procedure (Organic Syntheses, CV6, p 142) from commercially available norbornene 29 as illustrated in Scheme 3.

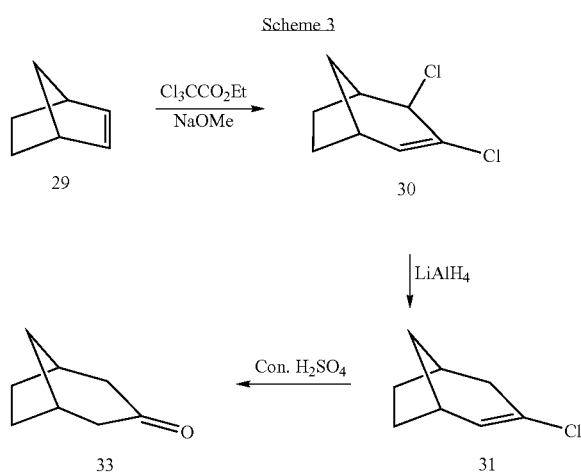

B. Preparation of Compound 34

Compound 34 was prepared from 1 g of Compound 33 by a Vilsmeier reaction using the procedure described for Compound 27.

C. Preparation of Compound 35

Compound 35, N(4-sulfonato)-2,3,3 trimethyl-5-sulfo-indolinine was prepared in the same manner as described for Compound 28.

D. Preparation of Compound 36

0.1 mmol of Compound 34 and 0.2 mmol of compound 35 were mixed in a glass tube to which was added 2 mL acetic acid, 2 mL acetic anhydride and 1 mmol sodium acetate. The tube was sealed and heated at 110° C. Dye formation was indicated by the reaction mixture turning green. After 5 hours, the reaction mixture was cooled, 5 mL ethyl acetate added, and the precipitated dye was washed twice with ethyl acetate. Supernatant solvents were discarded, and the residue after speed vacuum drying was purified on a semi prep RPC18 HPLC column, which afforded 65% of pure Compound 36. It was identified by MALDI. MW 886.49 calculated for $C_{38}H_{46}ClN_2O_{12}S_4^+$, found 886.01. Abs. max: 794 nm (water), 802 nm (MeOH); Em. max: 814 nm (water), 823 nm (MeOH).

E. Preparation of Compound 15

Compound 15 is obtained from Compound 36 by the reaction of mercaptopropionic acid in DMF and triethylamine at room temperature overnight, followed by HPLC purification.

Example 3

Synthesis of Compound 38

A. Preparation of Compound 37

2,3,3-Trimethylbenzindole-5,7-disulfonate (3.1 g, 7 mmol) was dissolved in 25 mL of dry DMF resulting in a clear orange solution. Ethyl iodide, 3 mL (5.85 g, 37.5 mmol, Aldrich) was added and the solution was heated to 130° C. in a sealed tube for 16 hours. The reaction mixture, which turned dark purple was cooled and poured into 150 mL of ethyl ether. The mixture was centrifuged and the solvent decanted off. The solid product was further washed in the tube with three 25 mL portions of 2-propanol followed by 25 mL of ether and dried in vacuum. 2.6 g of dark purple solid (85%) was obtained and confirmed by MALDI-TOF-MS. m/e 397.1 [M]+ calculated for $C_{17}H_{19}NO_6S_2^+$, found 397.6.

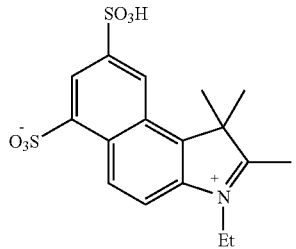

B. Preparation of Compound 38

Compound 38 was synthesized using compounds 27 and 37, by following the same procedure that was described for the synthesis of compound 11. The yield was 65% yield. Abs. max: 805 nm (water), 814 nm (MeOH); Em. Max: 827 nm (water), 835 nm (MeOH).

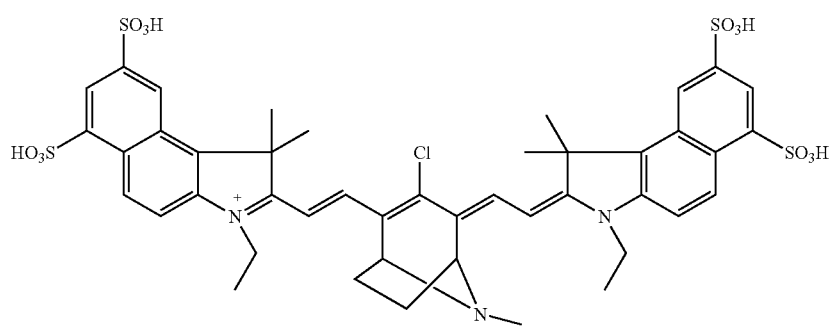

Example 4

Synthesis of Compound 13

Compound 13 (structure shown below) was produced from Compound 39 (structure shown below) as described in this Example.

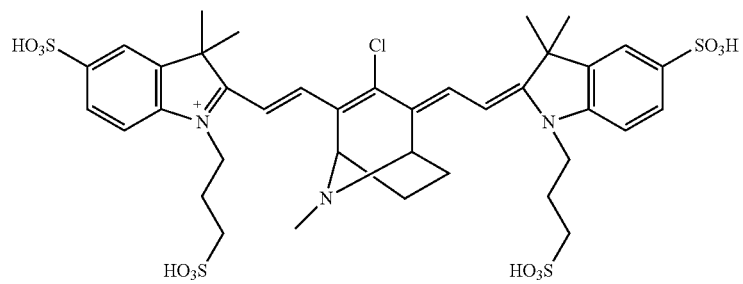

-continued

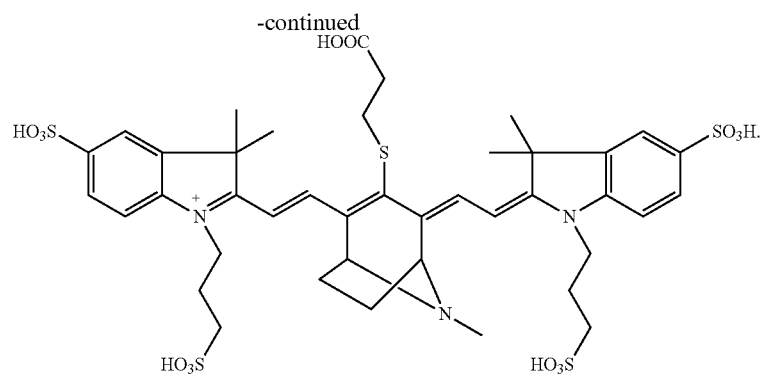

13

A. Preparation of Compound 39

Compound 39 was synthesized from Compound 27 and the respective quaternary salt 35 by a procedure similar to that described for Compound 11. MALDI calculated for $C_{38}H_{47}ClN_3O_{12}S_4^+$: 901.51; Found: 901.27. Abs. max: 768 nm (water), 780 nm (MeOH); Em. max: 788 nm (water), 802 nm (MeOH).

B. Preparation of Compound 13

Compound 13 was obtained from Compound 39 by carrying out a reaction with 3-mercapto propionic acid and triethylamine in DMF at room temperature using the procedure described for Compounds 15 and 12. MALDI calculated for $C_{41}H_{51}KN_3O_{14}S_5^+$: 1009.28; Found: 1008.99. Abs. max: 777 nm (water), 788 nm (MeOH); Em. max: 797 nm (water), 810 nm (MeOH).

Example 5

Cell Labeling

Mouse splenocytes are prepared as a single cell suspension, and the T cell subpopulation within the splenocyte preparation are enriched by passage over a column that removes B cells and macrophages (R&D kit, Mouse T-cell enrichment columns, MTCC500). T cells then are centrifuged to generate a cell pellet of $10^7$ cells. The supernatant is removed from the cell pellet, and a solution of 10 mg/mL N-hydroxysuccinimide ester of Compound 12 in 100 µL is added. The cells are incubated at room temperature for 5 minutes, followed by 2 rounds of centrifugation and resuspension in physiological buffer to wash away unbound Compound 12. Cells are assessed by fluorescence microscopy.

Example 6

Cell Labeling and In Vivo Imaging

Mouse 4T1 breast adenocarcinoma cells are centrifuged to generate a cell pellet of $10^7$ cells. The supernatant is removed from the cell pellet, and a solution of 10 mg/mL N-hydroxysuccinimide ester of Compound 12 in 100 µL is added. Cells are incubated at room temperature for 5 minutes, followed by 2 rounds of centrifugation and resuspension in physiological buffer to wash away unbound Compound 12. Cells are assessed by fluorescence microscopy.

Cells are injected intravenously into mice at $5 \times 10^5$ cells per mouse, and live mice are imaged by fluorescent molecular tomography immediately after injection and 24 hours after injection. As 4T1 cells primarily metastasize to the lungs, lung fluorescence can be quantified.

Example 7

FMT Imaging With a Compound 12-Peptide Conjugate

A solution of the N-hydroxysuccinimide ester of Compound 12 is chemically linked to an Arg-Gly-Asp containing peptide under basic conditions to yield a biocompatible fluorescent molecule for in vivo optical imaging.

The tumor cell line HT-29 (human colon carcinoma/HTB-38) is obtained from ATCC (Manassas, Va.). HT-29 cells are grown in McCoy's supplemented with 10% FBS at 37° C. in a humidified atmosphere containing 5% $CO_2$. Exponentially growing cells are trypsinized and re-suspended in Hank's Balanced Salt Solution at a concentration of $3 \times 10^7$ cells/mL. Female NU/NU mice 6-8 weeks old (Charles River Laboratory, Wilmington, Mass.) are injected subcutaneously with $3 \times 10^6$ HT-29 cells bilaterally in the first mammary fat pads. One week later, when tumors are approximately 30 mm³, the mice are injected intravenously with the fluorescent molecule (in 150 µL of 1×PBS) and imaged after 24 hours on a fluorescence reflectance system (FRI, Kodak 2000MM) system and a Fluorescence Tomography System (FMT) from VisEn Medical, Inc. (Woburn, Mass.).

Example 8

In Vivo Imaging of Bone Growth with Compound 12

A solution of the N-hydroxysuccinimide ester of Compound 12 is chemically linked to a bisphosphonate containing biomolecule under basic conditions to yield a biocompatible fluorescent molecule for in vivo optical imaging.

Five day-old BALB/c×CF-1 $F_1$ mice are injected subcutaneously with the fluorescent molecule (in 15 µL 1×PBS) and imaged 24 hours later using a fluorescence reflectance imaging (FRI) system (Kodak 2000MM). Areas of bone growth are imaged.

Example 9

Nanoparticle Labeling

A solution of the N-hydroxysuccinimide ester of Compound 12 is chemically linked to amine groups disposed on a polymeric surface of iron oxide nanoparticles to yield a biocompatible fluorescent platform for in vivo fluorescence imaging. Subsequent coupling of polyethyleneglycol to these nanoparticles yields a biocompatible imaging agent suitable for fluorescence imaging and intravital microscopy.

Incorporation by Reference

All publications, patents, and patent applications cited herein are hereby expressly incorporated by reference in their entirety and for all purposes to the same extent as if each was so individually denoted.

Equivalents

The invention may be embodied in other specific forms without departing form the spirit or essential characteristics thereof. The foregoing embodiments are therefore to be considered in all respects illustrative rather than limiting on the invention described herein. Scope of the invention is thus indicated by the appended claims rather than by the foregoing description, and all changes that come within the meaning and range of equivalency of the claims are intended to be embraced therein

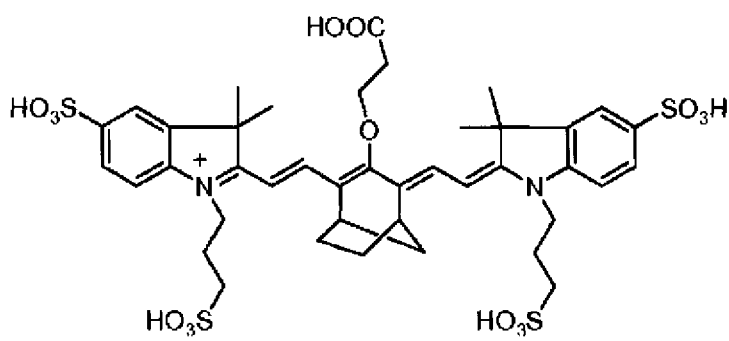

What is claimed is:

1. A compound represented by Formula I:

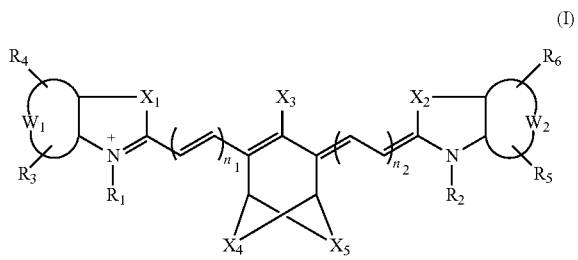

or a salt thereof, wherein:
$X_1$ and $X_2$ each independently are selected from the group consisting of $C(CH_2K_1)(CH_2K_2)$, O, S, and Se, wherein $K_1$ and $K_2$ each independently are selected from the group consisting of H and $C_1$-$C_{20}$ alkyl; wherein $K_1$ and $K_2$ together can optionally form part of a cyclic ring;
$R_1$ and $R_2$ each independently are selected from the group consisting of H, $C_{1-20}$ alkyl, alkylaryl, and —$R_9T_1$, wherein
$R_9$ is independently selected from the group consisting of $C_1$-$C_{20}$ alkyl, aryl, alkylaryl, and —(CH$_2$—O—CH$_2$)$_y$CH$_2$, wherein y is an integer selected from 1 to 100, and
$T_1$ is a linker moiety capable of forming a covalent bond with a biomolecule;
$X_3$ is selected from the group consisting of H, halogen, -$T_2R_{10}$, -$T_2R_9T_1$, and —$R_9T_1$, wherein
$T_2$ is selected from the group consisting of S, O, and NR',
$R_{10}$ is selected from the group consisting of H, $C_{1-20}$ alkyl, aryl, arylalkyl;
$X_4$ and $X_5$ each independently are selected from the group consisting of $(CK_1K_2)_i$; NR', —NR'R$_9$T$_1$, O, and S, wherein
i is an integer selected from 1 to 7, and
R' is selected from the group consisting of H and alkyl;
$W_1$ and $W_2$ each represent nonmetal atoms as part of an aryl moiety;
$n_1$ and $n_2$ each independently are selected from 0 to 4;
$R_3$, $R_4$, $R_5$ and $R_6$ each independently are selected from the group consisting of H, halogen, carboxylate, carboxylic acid, carboxylic ester, amine, amide, sulfonamide, hydroxyl, O-alkyl, S-alkyl, alkyl, sulfonic acid, sulfonate, a phosphoryl, $SO_2NR_7$-Q-CHR$_8$—[(CH$_2$)$_m$—Y—(CH$_2$)$_p$—(O)$_k$]$_h$(CH$_2$)$_d$T$_1$, and —$R_9T_1$, wherein
$R_7$ independently is selected from the group consisting of $C_1$-$C_{20}$ alkyl, aryl, alkylaryl,
$R_8$ independently is selected from the group consisting of H, $C_1$-$C_{20}$ alkyl, aryl, alkylaryl and arylalkyl;
$R_7$ and $R_8$, when taken in combination, optionally form a 4-, 5-, 6- or 7-member, optionally substituted, saturated or unsaturated ring,
Q independently is selected from the group consisting of a bond, carbonyl, $C_1$-$C_6$ alkyl, and $C_1$-$C_6$ cycloalkyl,
Y independently is selected from the group consisting of a bond, —SO$_2$NR$^1$—, —O—, —COO—, and —CONR'—,
h is an integer selected from 0 to 70,
k is 0 or 1,
d is an integer from 0 to 12,
m is an integer from 0 to 12, and
p is an integer from 0 to 12.

2. The compound of claim 1, wherein the molecule has an absorption and emission wavelength in the range from about 500 nm to about 1100 nm.

3. The compound of claim 2, wherein the molecule has an absorption and emission wavelength in the range from about 600 nm to about 900 nm.

4. The compound of claim 1, wherein $X_3$ is selected from the group consisting of: O—(CH$_2$)$_j$-T$_1$, S—(CH$_2$)$_j$-T$_1$, O-Ph-(CH$_2$)$_j$-T$_1$, S-Ph-(CH$_2$)$_j$-T$_1$, wherein
j is an integer from 0 to 6; and
Ph is phenyl.

5. The compound of claim 4, wherein $T_1$ is selected from the group consisting of —NH$_2$, —OH, —SH, —SO$_3$H, carboxyl, —COCl, —(CO)O(CO)R$_{13}$, —CONHNH$_2$,

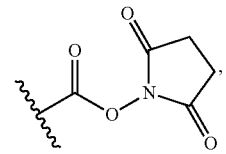

which is substituted or unsubstituted,

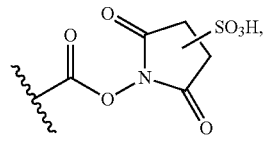

which is substituted or unsubstituted,

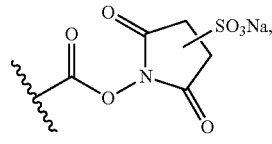

which is substituted or unsubstituted,

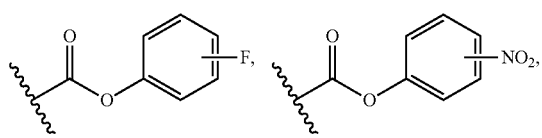

azido, —NCS, —CHO, —COCH$_2$I,

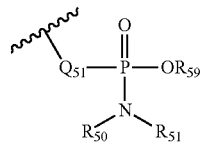

phthalamido, and maleimido, wherein

- R$_{13}$ is selected from the group consisting of H, alkyl and aryl;
- R$_{50}$ and R$_{51}$ independently are selected from the group consisting of hydrogen, alkyl, alkenyl, —(CH$_2$)$_m$—R$_{61}$ and carbonyl; or R$_{50}$ and R$_{51}$, taken together with the N atom to which they are attached complete a heterocycle having from 4 to 8 atoms in the ring structure;
- R$_{61}$ is selected from the group consisting of aryl, cycloalkyl, cycloalkenyl, heterocycle and polycycle;
- m is zero or an integer in the range of 1 to 8;
- R$_{59}$ is selected from the group consisting of hydrogen, alkyl and aryl; and
- Q$_{51}$ is selected from the group consisting of O, S and N.

6. The compound of claim 1, wherein X$_4$ is —CH$_2$—CH$_2$— and X$_5$ is selected from the group consisting of —CH$_2$—, —NCH$_3$, and —C(CH$_3$)$_2$.

7. The compound of claim 1, wherein n$_1$ and n$_2$ are 1.

8. The compound of claim 1, wherein W$_1$ and W$_2$ are the same.

9. The compound of claim 8, wherein W$_1$ and W$_2$ are selected from the group consisting of:

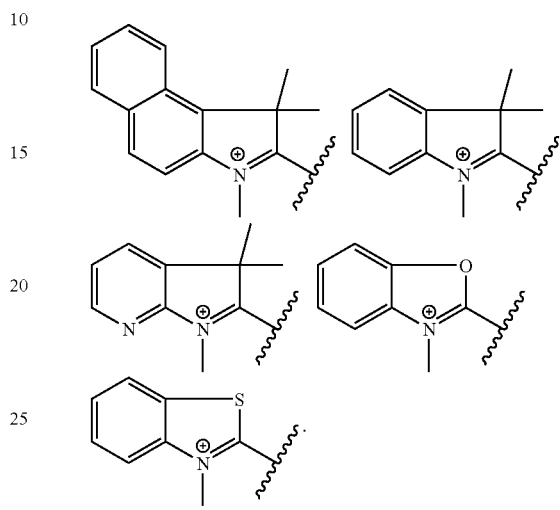

10. The compound of claim 1, wherein X$_1$ and X$_2$ are C(CH$_3$)$_2$.

11. The compound of claim 1, having any one of the formulae 11-22:

11

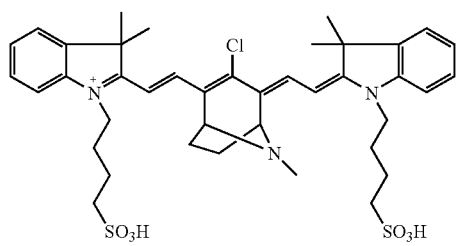

12

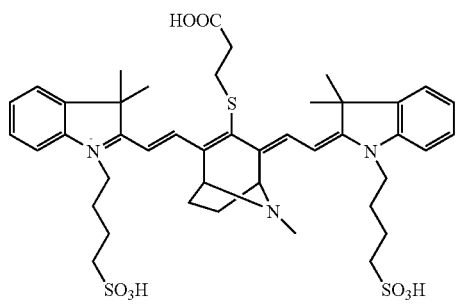

13

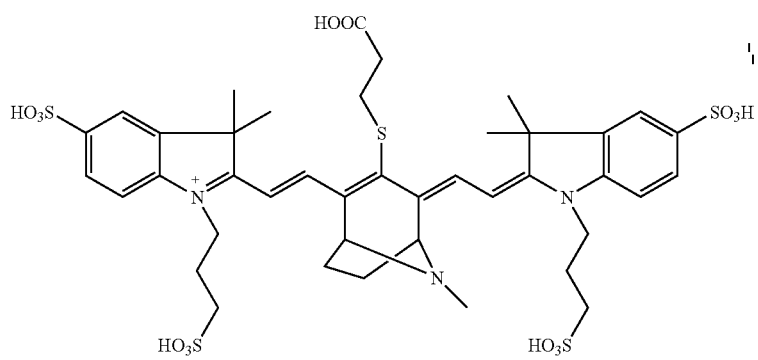

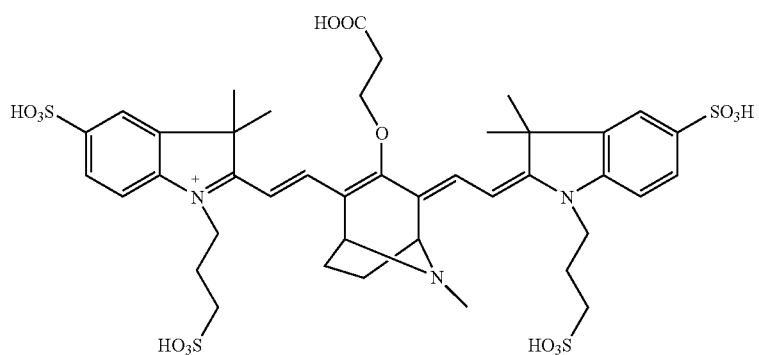
14
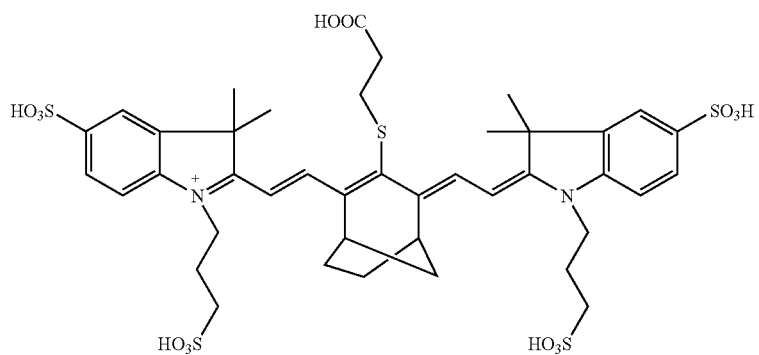
15
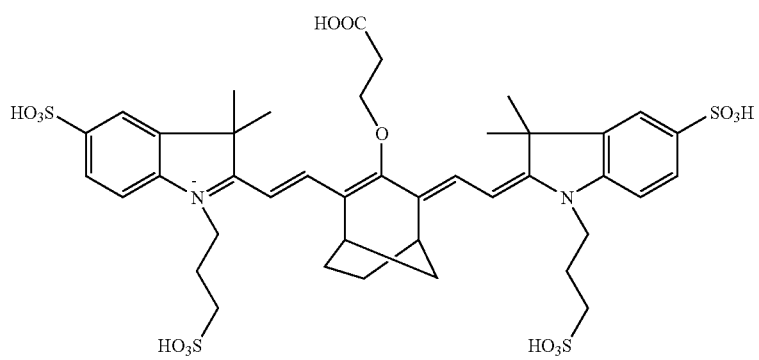
16
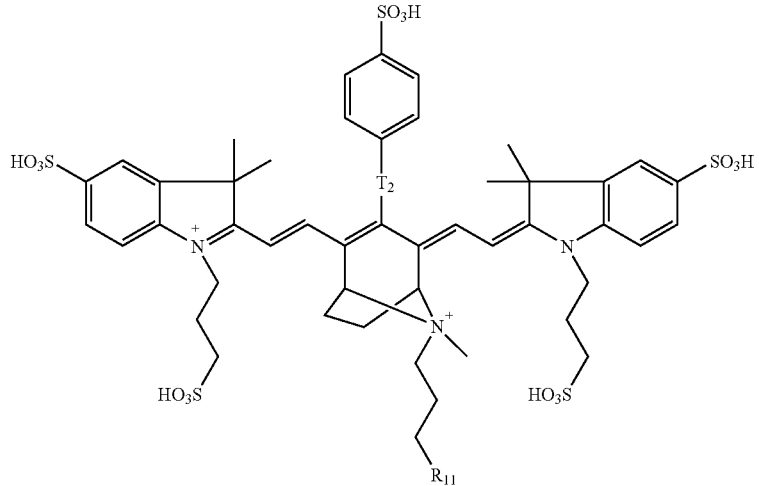
17

-continued
18
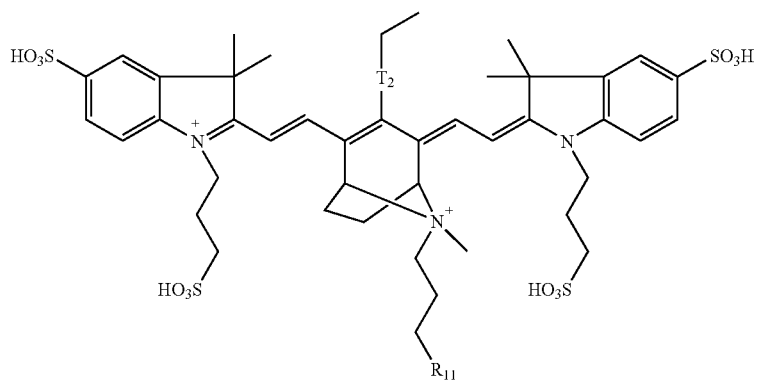
19
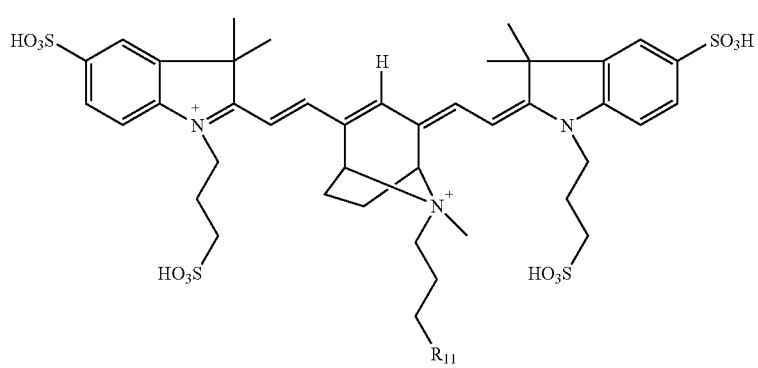
20
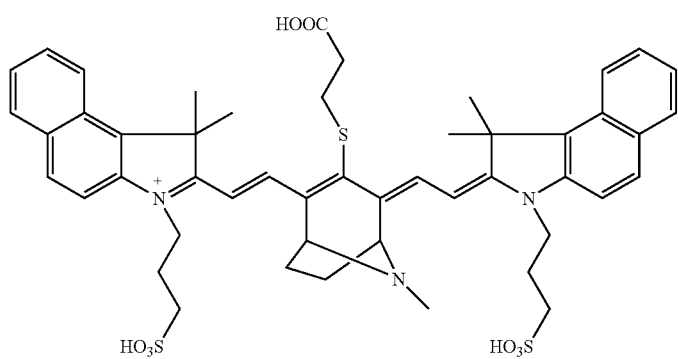
21
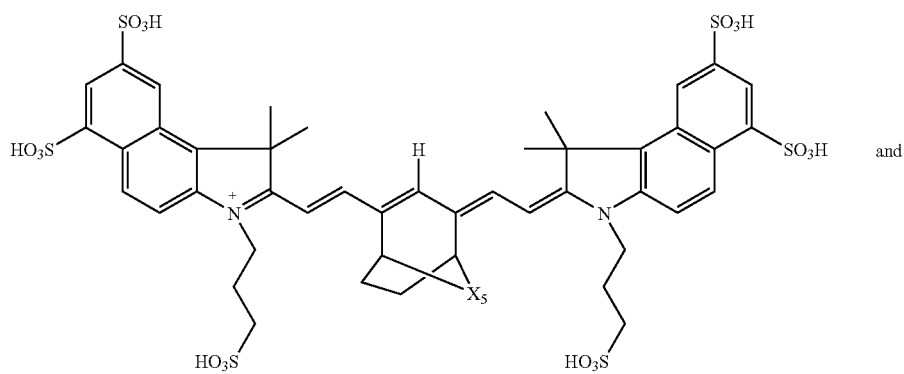
and

22

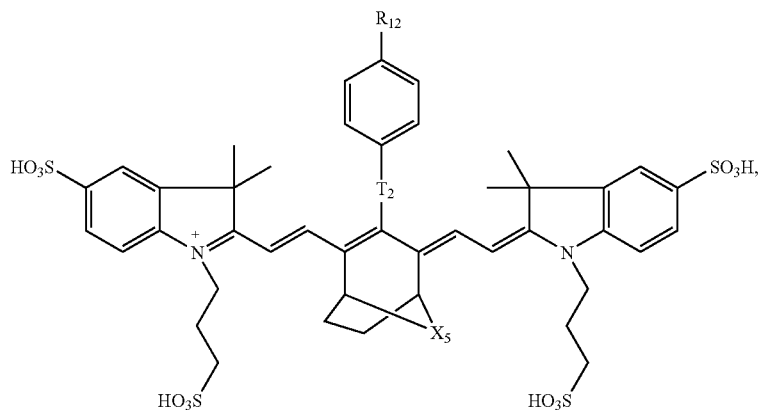

and a salt thereof, wherein:
$T_2$ is O or S;
$X_5$ is N-Me or $CH_2$;
$R_{11}$ selected from the group consisting of: $SO_3H$, COOH, OH, SH, and $NH_2$;
$R_{12}$ is selected from the group consisting of: H, $SO_3H$, NCS, $(CH_2)_k COOH$, wherein k is an integer from 0 to 6.

12. The compound of claim 1, wherein the compound is biocompatible.

13. A compound represented by the general structural formulae 40 and 41:

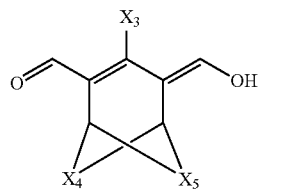

40

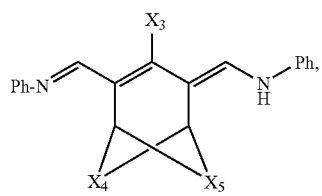

41 wherein
Ph is phenyl;
$X_3$ is selected from the group consisting of H, halogen, $-T_2R_{10}$, $-T_2R_9T_1$, and $-R_9T_1$;
$X_4$ and $X_5$ each independently are selected from the group consisting of $(CK_1K_2)_i$; NR', $-NR'R_9T_1$, O, and S;
$T_1$ is a linker moiety capable of forming a covalent bond with a biomolecule;
$T_2$ is selected from the group consisting of S, O, and NR';
$R_9$ is independently selected from the group consisting of $C_1$-$C_{20}$ alkyl, aryl, alkylaryl, and $-(CH_2-O-CH_2)_y CH_2$, wherein y is an integer selected from 1 to 100;
$R_{10}$ is selected from the group consisting of H, $C_{1-20}$ alkyl, aryl, arylalkyl;
i is an integer selected from 1 to 7;
R' is selected from the group consisting of H and alkyl; and $K_1$ and $K_2$ each independently are selected from the group consisting of H and $C_1$-$C_{20}$ alkyl; wherein $K_1$ and $K_2$ together can optionally form part of a cyclic ring.

14. The compound of claim 13, wherein $X_4$ and $X_5$ each independently are selected from the group consisting of $CH_2-CH_2$, NMe, and $CMe_2$.

15. The compound of claim 13 having any of the following structures represented by the formulae 42-45:

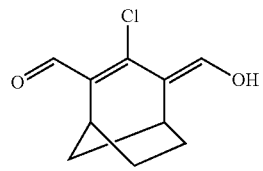

42

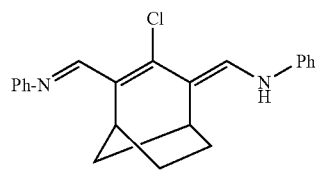

43

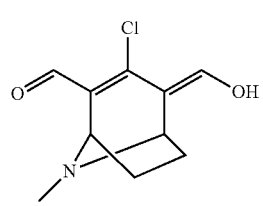

44

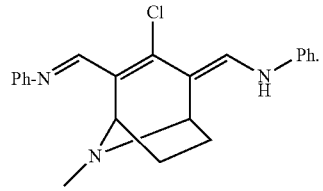

45

16. A fluorescent biomolecule represented by:

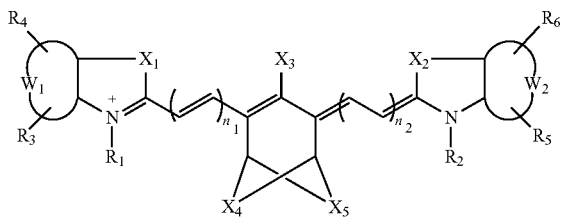

or a salt thereof, wherein:
$X_1$ and $X_2$ each independently are selected from the group consisting of $C(CH_2K_1)(CH_2K_2)$, O, S, and Se, wherein $K_1$ and $K_2$ each independently are selected from the group consisting of H and $C_1$-$C_{20}$ alkyl; wherein $K_1$ and $K_2$ together can optionally form part of a cyclic ring;
$R_1$ and $R_2$ each independently are selected from the group consisting of H, $C_{1-20}$ alkyl, alkylaryl, and —$R_9T_1$, wherein
$R_9$ is independently selected from the group consisting of $C_1$-$C_{20}$ alkyl, aryl, alkylaryl, and —$(CH_2$—O—$CH_2)_yCH_2$, wherein y is an integer selected from 1 to 100;
$X_3$ is selected from the group consisting of H, halogen, -$T_2R_{10}$,-$T_2R_9T_1$, and —$R_9T_1$, wherein
$T_2$ is selected from the group consisting of S, O, and NR',
$R_{10}$ is selected from the group consisting of H, $C_{1-20}$ alkyl, aryl, arylalkyl;
$X_4$ and $X_5$ each independently are selected from the group consisting of $(CK_1K_2)_i$; NR', —NR'$R_9T_1$, O, and S, wherein
i is an integer selected from 1 to 7, and
R' is selected from the group consisting of H and alkyl;
$W_1$ and $W_2$ each represent nonmetal atoms as part of an aryl moiety;
$n_1$ and $n_2$ each independently are selected from 0 to 4;
$R_3$, $R_4$, $R_5$ and $R_6$ each independently are selected from the group consisting of H, halogen, carboxylate, carboxylic acid, carboxylic ester, amine, amide, sulfonamide, hydroxyl, O-alkyl, S-alkyl, alkyl, sulfonic acid, sulfonate, a phosphoryl, $SO_2NR_7$-Q-$CHR_8$—[$(CH_2)_m$—Y—$(CH_2)_p$—$(O)_k]_h(CH_2)_dT_1$, and —$R_9T_1$, wherein
$R_7$ independently is selected from the group consisting of $C_1$-$C_{20}$ alkyl, aryl, alkylaryl,
$R_8$ independently is selected from the group consisting of H, $C_1$-$C_{20}$ alkyl, aryl, alkylaryl and arylalkyl;
$R_7$ and $R_8$, when taken in combination, optionally form a 4-, 5-, 6- or 7-member, optionally substituted, saturated or unsaturated ring,
Q independently is selected from the group consisting of a bond, carbonyl, $C_1$-$C_6$ alkyl, and $C_1$-$C_6$ cycloalkyl,
Y independently is selected from the group consisting of a bond, —$SO_2NR^1$—, —O—, —COO—, and —CONR'—,
h is an integer selected from 0 to 70,
k is 0 or 1,
d is an integer from 0 to 12,
m is an integer from 0 to 12,
p is an integer from 0 to 12;
$T_1$ is a linker moiety covalently bonded to BM; and
BM is a biomolecule, wherein the fluorescent biomolecule comprises at least one BM.

17. The fluorescent biomolecule of claim 16, wherein the BM is a cell, a protein, or a nucleic acid.

18. A method of in vivo optical imaging, the method comprising:
a. administering to a subject a fluorescent biomolecule of claim 16;
b. exposing the subject to light of a wavelength absorbable by the fluorescent biomolecule; and
c. detecting an optical signal emitted by the fluorescent biomolecule.

19. The method of claim 18, wherein the signal emitted by the fluorescent biomolecule is used to construct an image.

20. The method of claim 19, wherein the image is a tomographic image.

21. The method of claim 20, wherein the tomographic image is co-registered with an image obtained by magnetic resonance or X-ray computed tomography.

22. The method of claim 18, wherein steps (a)-(c) are repeated at predetermined intervals to permit evaluation of the emitted signals of the fluorescent biomolecule in the subject over time.

23. The method of claim 18, wherein the subject is an animal or human.

24. The method of claim 18, wherein in step (a), two or more fluorescent biomolecules whose signal properties are distinguishable are administered to the subject.

25. The method of claim 18, wherein steps (b) and (c) are performed using an endoscope, catheter, tomographic system, planar imaging system, hand-held optical imaging system, or an intraoperative microscope.

26. The method of claim 18, wherein the presence, absence, or level of signal emitted by the fluorescent biomolecule is indicative of a disease state.

27. The method of claim 18, further comprising, after step c, detecting a disease.

28. The method of claim 18, further comprising, after step c, monitoring a disease.

29. The method of claim 26, wherein the disease is selected from the group consisting of bone disease, cancer, cardiovascular disease, dermatological disease, environmental disease, immunologic disease, infectious disease, inflammation, inherited disease, metabolic disease, neurodegenerative disease, ophthalmic disease, and respiratory disease.

30. The method of claim 26, wherein the disease is an inflammatory disease.

31. The method of claim 26, wherein the disease is cancer.

32. The method of claim 26, wherein the disease is cardiovascular disease.

33. The method of claim 18, wherein, during step (a), the BM is a cell and the fluorescent biomolecule is administered to the subject.

34. The method of claim 31, wherein signal emitted by the fluorescent biomolecule is used to monitor transport and localization of cells or to evaluate the efficacy of a cell therapy.

35. An in vitro optical imaging method, the method comprising:
a) contacting a sample with the fluorescent biomolecule of claim 16;
b) allowing the fluorescent biomolecule to bind to a biological target;
c) optionally, removing unbound fluorescent biomolecule;
d) exposing the sample to light of a wavelength absorbable by the fluorescent biomolecule; and
e) detecting signal emitted from the fluorescent biomolecule thereby to determine whether the fluorescent biomolecule has bound to the biological target.

36. The method of claim 35, wherein the sample is a biological sample.

37. The fluorescent biomolecule of claim 16, wherein the fluorescent biomolecule has an absorption maxima and an emission maxima in the range from about 500 nm to about 1100 nm.

38. The fluorescent biomolecule of claim 37, wherein the fluorescent biomolecule has an absorption maxima and an emission maxima in the range from about 600 nm to about 900 nm.

39. The fluorescent biomolecule of claim 16, wherein $X_3$ is selected from the group consisting of: O—$(CH_2)_j$-$T_1$, S—$(CH_2)_j$-$T_1$, O-Ph-$(CH_2)_j$-$T_1$, S-Ph-$(CH_2)_j$-$T_1$, wherein
j is an integer from 0 to 6; and
Ph is phenyl.

40. The fluorescent biomolecule of claim 16, wherein $T_1$ is selected from the group consisting of —$NH_2$, —OH, —SH, —$SO_3H$, carboxyl, —COCl, —(CO)O(CO)$R_{13}$, —$CONHNH_2$,

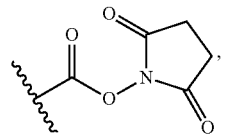

which is substituted or unsubstituted,

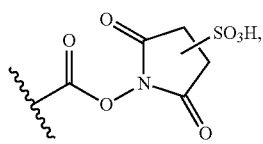

which is substituted or unsubstituted,

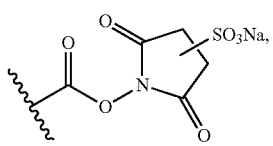

which is substituted or unsubstituted,

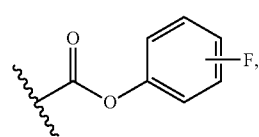

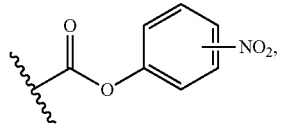

azido, —NCS, —CHO, —$COCH_2I$,

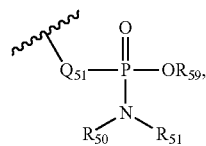

phthalamido, and maleimido, wherein
$R_{13}$ is selected from the group consisting of H, alkyl and aryl;
$R_{50}$ and $R_{51}$ are independently selected from the group consisting of hydrogen, alkyl, alkenyl, —$(CH_2)_m$—$R_{61}$ and carbonyl; or $R_{50}$ and $R_{51}$, taken together with the N atom to which they are attached complete a heterocycle having from 4 to 8 atoms in the ring structure;
$R_{61}$ is selected from the group consisting of aryl, cycloalkyl, cycloalkenyl, heterocycle and polycycle;
m is zero or an integer in the range of 1 to 8;
$R_{59}$ is selected from the group consisting of hydrogen, alkyl and aryl; and
$Q_{51}$ is selected from the group consisting of O, S and N.

41. The fluorescent biomolecule of claim 16, wherein $X_4$ is —$CH_2$—$CH_2$— and $X_5$ is selected from the group consisting of —$CH_2$, —$NCH_3$, and —$C(CH_3)_2$.

42. The fluorescent biomolecule of claim 16, wherein $n_1$ and $n_2$ are 1.

43. The fluorescent biomolecule of claim 16, wherein $W_1$ and $W_2$ are the same.

44. The fluorescent biomolecule of claim 43, wherein $W_1$ and $W_2$ are selected from the group consisting of:

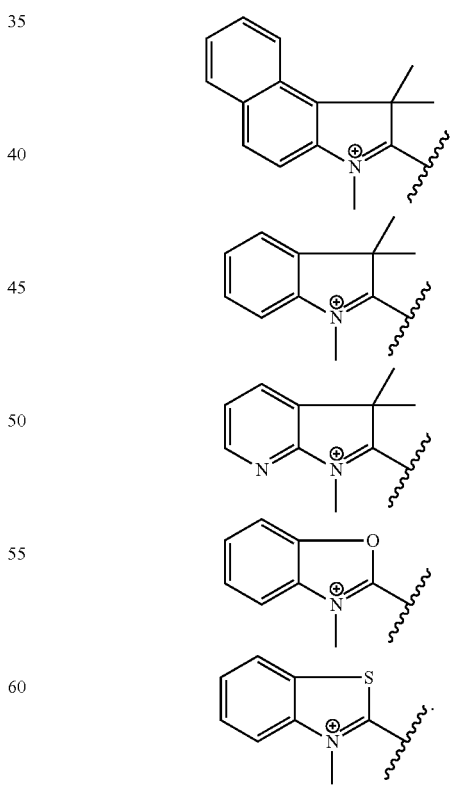

45. The fluorescent biomolecule of claim 16, wherein $X_1$ and $X_2$ are $C(CH_3)_2$.

46. The fluorescent biomolecule of claim 16, wherein the fluorescent biomolecule is represented by:

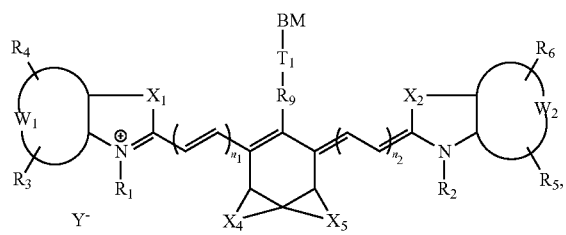

wherein Y⁻ is a counterion.

47. The fluorescent biomolecule of claim 16, wherein the fluorescent biomolecule is represented by:

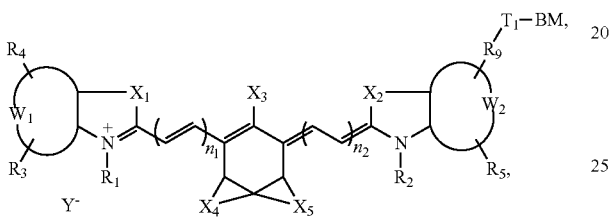

wherein Y⁻ is a counterion.

48. The fluorescent biomolecule of claim 16, wherein the fluorescent biomolecule is represented by:

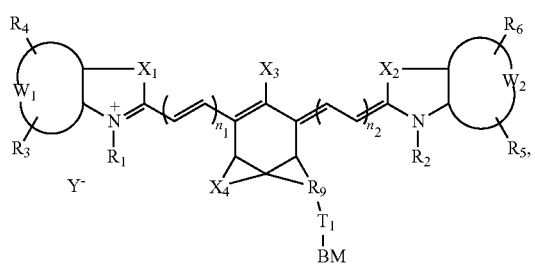

wherein Y⁻ is a counterion.

* * * * *

UNITED STATES PATENT AND TRADEMARK OFFICE
CERTIFICATE OF CORRECTION

PATENT NO. : 8,221,721 B2
APPLICATION NO. : 12/028209
DATED : July 17, 2012
INVENTOR(S) : Narasimhachari Narayanan It is certified that error appears in the above-identified patent and that said Letters Patent is hereby corrected as shown below:

Claim number 11, column 40, lines 38-47, replace

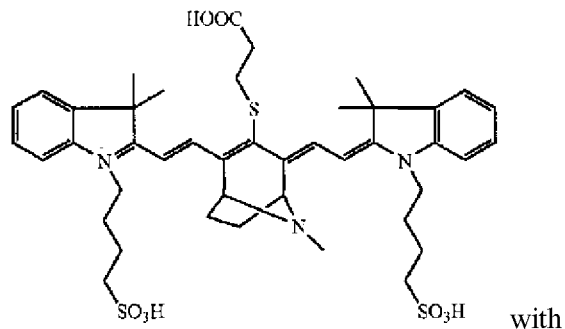

with

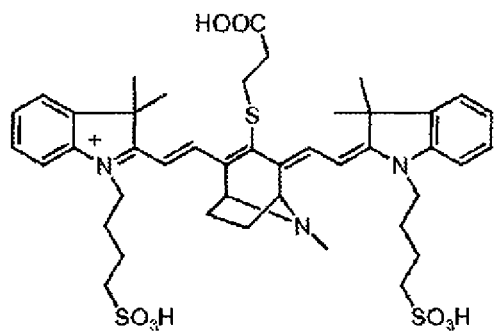

Signed and Sealed this
Twenty-third Day of October, 2012

David J. Kappos
*Director of the United States Patent and Trademark Office*

CERTIFICATE OF CORRECTION (continued)
U.S. Pat. No. 8,221,721 B2

Claim number 11, columns 41 and 42, lines 34-47, replace

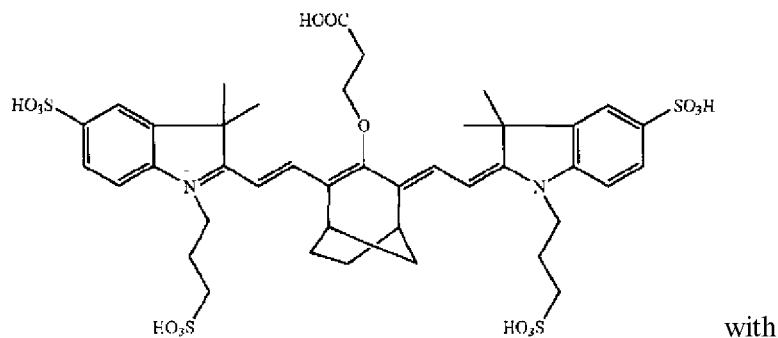 with